United States Patent
Pradjinata

(10) Patent No.: US 11,782,958 B2
(45) Date of Patent: *Oct. 10, 2023

(54) MULTI-USER CROSS-DEVICE TRACKING

(71) Applicant: LendingClub Corporation, San Francisco, CA (US)

(72) Inventor: Wira Pradjinata, Fremont, CA (US)

(73) Assignee: LENDINGCLUB CORPORATION, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/496,501

(22) Filed: Oct. 7, 2021

(65) Prior Publication Data
US 2022/0027390 A1     Jan. 27, 2022

Related U.S. Application Data

(63) Continuation of application No. 16/428,204, filed on May 31, 2019, now Pat. No. 11,170,029.

(51) Int. Cl.
*G06F 16/28* (2019.01)
*G06F 16/22* (2019.01)
(Continued)

(52) U.S. Cl.
CPC ........ *G06F 16/288* (2019.01); *G06F 16/2228* (2019.01); *G06F 16/2379* (2019.01);
(Continued)

(58) Field of Classification Search
USPC ....................................................... 707/603
See application file for complete search history.

(56) References Cited

U.S. PATENT DOCUMENTS 5,847,972 A     12/1998     Eick et al.
6,606,744 B1    8/2003      Mikurak
(Continued)

OTHER PUBLICATIONS

Heap, "JavaScript", Suggest Edits, https://docs.heap.io/reference#track, last viewed on May 6, 2019, 15 pages.
(Continued)

*Primary Examiner* — Cam Linh T Nguyen
(74) *Attorney, Agent, or Firm* — Hickman Becker Bingham Ledesma LLP

(57) ABSTRACT

Embodiments collect, from an event stream having both client-side and server-side information from multiple tracking sources, user interaction records for a web application and supporting systems. The records are stored in a data store, and are retroactively correlated with conclusive user identifiers and, if applicable, with areas of interest. Attribution of interaction records to conclusive identifiers and areas of interest is based on links that have been established between identifiers. Established identifier links may be subject to one or more link removal criteria. If link removal criteria is satisfied for an established link, the link is broken. Once a link is broken, interaction records, found in the data store, that are associated with the inconclusive identifier of the broken link are no longer associated with the conclusive identifier of the broken link. Each interaction record that is associated with a conclusive identifier is assigned a confidence metric for the association.

20 Claims, 10 Drawing Sheets

(51) Int. Cl.
*G06F 16/2455* (2019.01)
*G06F 16/23* (2019.01)
*H04L 67/50* (2022.01)
*H04L 67/01* (2022.01)

(52) U.S. Cl.
CPC ...... *G06F 16/24568* (2019.01); *H04L 67/535* (2022.05); *H04L 67/01* (2022.05)

(56) References Cited

U.S. PATENT DOCUMENTS

| | | | |
|---|---|---|---|
| 6,671,818 | B1 | 12/2003 | Mikurak |
| 7,124,101 | B1 | 10/2006 | Mikurak |
| 7,716,077 | B1 | 5/2010 | Mikurak |
| 8,032,409 | B1 | 10/2011 | Mikurak |
| 8,078,639 | B2 | 12/2011 | Christiansen |
| 8,316,237 | B1 | 11/2012 | Felsher et al. |
| 8,332,349 | B1 | 12/2012 | Wilson |
| 8,413,250 | B1 | 4/2013 | Krynski |
| 9,332,081 | B2 * | 5/2016 | Gatto ............... H04L 67/535 |
| 9,424,140 | B1 | 8/2016 | Madhavarapu |
| 9,578,063 | B1 | 2/2017 | Iyer et al. |
| 9,659,026 | B2 | 5/2017 | Leverett |
| 9,843,643 | B2 | 12/2017 | Martha |
| 9,846,526 | B2 | 12/2017 | Lemus |
| 9,858,274 | B2 | 1/2018 | Barker |
| 9,928,262 | B2 | 3/2018 | Baum |
| 10,097,654 | B2 | 10/2018 | Zhou |
| 10,129,072 | B1 | 11/2018 | Field et al. |
| 10,134,044 | B1 | 11/2018 | Shoemaker |
| 10,540,374 | B2 | 1/2020 | Singh |
| 10,606,804 | B2 | 3/2020 | Boyle |
| 10,757,122 | B2 | 8/2020 | Vasudevan |
| 11,200,130 | B2 | 12/2021 | Tankersley et al. |
| 2003/0182310 | A1 | 9/2003 | Charnock et al. |
| 2004/0064351 | A1 | 4/2004 | Mikurak |
| 2004/0255201 | A1 | 12/2004 | Liu |
| 2006/0075492 | A1 | 4/2006 | Golan |
| 2006/0178918 | A1 | 8/2006 | Mikurak |
| 2007/0038683 | A1 | 2/2007 | Dixon et al. |
| 2007/0112864 | A1 | 5/2007 | Ben-Natan |
| 2007/0198663 | A1 | 8/2007 | Helander |
| 2007/0226231 | A1 | 9/2007 | Venkat |
| 2008/0104052 | A1 | 5/2008 | Ryan et al. |
| 2009/0254572 | A1 | 10/2009 | Redlich et al. |
| 2009/0287837 | A1 | 11/2009 | Felsher |
| 2009/0300002 | A1 | 12/2009 | Thomas et al. |
| 2010/0016879 | A1 | 1/2010 | Hafner |
| 2010/0114817 | A1 | 5/2010 | Broeder et al. |
| 2010/0250497 | A1 | 9/2010 | Redlich et al. |
| 2011/0016085 | A1 | 1/2011 | Kuo |
| 2011/0112974 | A1 | 5/2011 | Hinton |
| 2011/0209159 | A1 | 8/2011 | Baratz et al. |
| 2011/0276611 | A1 | 11/2011 | Verma |
| 2012/0030172 | A1 | 2/2012 | Pareek et al. |
| 2012/0102571 | A1 | 4/2012 | Sheldon |
| 2013/0138473 | A1 | 5/2013 | Balko et al. |
| 2013/0139164 | A1 | 5/2013 | Balko |
| 2013/0159021 | A1 | 6/2013 | Felsher |
| 2013/0185750 | A1 | 7/2013 | Ayoub |
| 2013/0263206 | A1 | 10/2013 | Nefedov et al. |
| 2013/0235830 | A1 | 12/2013 | Verma |
| 2014/0074764 | A1 | 3/2014 | Duftler |
| 2014/0189216 | A1 | 7/2014 | Flynn |
| 2014/0279930 | A1 | 9/2014 | Gupta |
| 2014/0279931 | A1 | 9/2014 | Gupta |
| 2014/0337861 | A1 | 11/2014 | Chang et al. |
| 2015/0120659 | A1 | 4/2015 | Srivastava et al. |
| 2015/0120678 | A1 | 4/2015 | Kong et al. |
| 2015/0163121 | A1 | 6/2015 | Mahaffey et al. |
| 2015/0169288 | A1 | 6/2015 | Yamamoto |
| 2015/0213358 | A1 | 7/2015 | Shelton et al. |
| 2016/0006837 | A1 | 1/2016 | Reynolds |
| 2016/0055226 | A1 | 2/2016 | Bruening et al. |
| 2016/0057507 | A1 | 2/2016 | McKenna |
| 2016/0077910 | A1 | 3/2016 | Dev |
| 2016/0105454 | A1 | 4/2016 | Li et al. |
| 2016/0162478 | A1 | 6/2016 | Blassin et al. |
| 2016/0180022 | A1 | 6/2016 | Paixao |
| 2016/0246849 | A1 | 8/2016 | Frampton et al. |
| 2016/0308769 | A1 | 10/2016 | VerSteeg |
| 2016/0364440 | A1 | 12/2016 | Lee et al. |
| 2016/0366534 | A1 | 12/2016 | Griesmann |
| 2017/0006141 | A1 | 1/2017 | Bhadra |
| 2017/0116252 | A1 | 4/2017 | Krishnaswamy et al. |
| 2017/0116335 | A1 | 4/2017 | Baby |
| 2017/0178025 | A1 | 6/2017 | Thomas et al. |
| 2017/0178026 | A1 | 6/2017 | Thomas et al. |
| 2017/0180403 | A1 | 6/2017 | Mehta et al. |
| 2017/0230544 | A1 | 8/2017 | Watts |
| 2017/0235846 | A1 | 8/2017 | Atlas |
| 2017/0270176 | A1 | 9/2017 | Horowitz |
| 2017/0315882 | A1 | 11/2017 | Yammine |
| 2017/0323247 | A1 | 11/2017 | Tran |
| 2018/0024901 | A1 | 1/2018 | Tankersley et al. |
| 2018/0034850 | A1 * | 2/2018 | Turgeman ............... G06F 21/31 |
| 2018/0041500 | A1 | 2/2018 | Menahem et al. |
| 2018/0091516 | A1 | 3/2018 | Nixon et al. |
| 2018/0096376 | A1 | 4/2018 | Rogener |
| 2018/0150496 | A1 | 5/2018 | Kim |
| 2018/0349458 | A1 | 12/2018 | Guirguis et al. |
| 2019/0028557 | A1 | 1/2019 | Modi |
| 2019/0171633 | A1 | 6/2019 | Demla |
| 2019/0392067 | A1 | 12/2019 | Sonawane et al. |
| 2020/0128047 | A1 | 4/2020 | Biswas et al. |
| 2020/0380016 | A1 | 12/2020 | Pradjinata |

OTHER PUBLICATIONS

Bounteous, "How Google Analytics Uses Cookies to Identify Users", https://www.bounteous.com/insights/2017/08/17/how-ggole-analytics-ccokies-identify-users/, dated May 6, 2019, 9 pages.
Autocapture, "Automatically Capture Behavioral Data", https://heap.io/autocapture, dated 2019, 6 pages.
Pradjinata, U.S. Appl. No. 16/428,204, filed May 31, 2019, Notice of Allowance and Fees Due dated Sep. 20, 2021.
Pradjinata, U.S. Appl. No. 16/428,204, filed May 31, 2019, Office Action dated Feb. 24, 2021.
Pradjinata, U.S. Appl. No. 16/428,204, filed May 31, 2019, Notice of Allowance dated Jul. 6, 2021.
Nikitina, U.S. Appl. No. 15/833,952, filed Dec. 6, 2017, Notice of Allowance, dated Jun. 13, 2018.
Nikitina, U.S. Appl. No. 15/833,943, filed Dec. 6, 2017, Office Action, dated Feb. 23, 2018.
Nikitina, U.S. Appl. No. 15/833,943, filed Dec. 6, 2017, Notice of Allowance, dated Sep. 19, 2018.
Delma, U.S. Appl. No. 16/231,918, filed Dec. 24, 2018, Notice of Allowance and Fees Due, dated May 11, 2022.
Delma, U.S. Appl. No. 16/231,918, filed Dec. 24, 2018, Notice of Allowance and Fees Due, dated Apr. 29, 2022.
Delma, U.S. Appl. No. 16/231,918, filed Dec. 24, 2018, Notice of Allowance and Fees Due, dated Feb. 9, 2022.
Delma, U.S. Appl. No. 16/231,918, filed Dec. 24, 2018, Notice of Allowance and Fees Due, dated Jan. 24, 2022.
Delma, U.S. Appl. No. 16/231,918, filed Dec. 24, 2018, Non-Final Rejection, dated Aug. 20, 2021.

* cited by examiner

202
COLLECT A PARTICULAR PLURALITY OF INFORMATION ITEMS THAT REFLECT INTERACTION BETWEEN ONE OR MORE CLIENT DEVICES AND A SERVER DEVICE, WHERE A PARTICULAR SET OF ONE OR MORE INFORMATION ITEMS, OF THE PARTICULAR PLURALITY OF INFORMATION ITEMS, ARE ASSOCIATED WITH A PARTICULAR NON-CONCLUSIVE IDENTIFIER

204
DETERMINE THAT A PARTICULAR INFORMATION ITEM, OF THE PARTICULAR PLURALITY OF INFORMATION ITEMS, (A) IS ASSOCIATED WITH THE PARTICULAR SET OF ONE OR MORE INFORMATION ITEMS, AND (B) INCLUDES A CONCLUSIVE IDENTIFIER THAT IDENTIFIES A PARTICULAR PERSON

206
RESPONSIVE TO DETERMINING THAT THE PARTICULAR INFORMATION ITEM INCLUDES THE CONCLUSIVE IDENTIFIER AND IS ASSOCIATED WITH THE PARTICULAR SET OF ONE OR MORE INFORMATION ITEMS, ASSOCIATE INFORMATION ITEMS OF THE PARTICULAR SET OF ONE OR MORE INFORMATION ITEMS WITH THE CONCLUSIVE IDENTIFIER

MULTI-USER CROSS-DEVICE TRACKING

CROSS-REFERENCE TO RELATED APPLICATIONS; BENEFIT CLAIM

This application claims the benefit as a Continuation of U.S. application Ser. No. 16/428,204, filed May 31, 2019, the entire contents of which is hereby incorporated by reference as if fully set forth herein, under 35 U.S.C. § 120. The applicant(s) hereby rescind any disclaimer of claim scope in the parent application(s) or the prosecution history thereof and advise the USPTO that the claims in this application may be broader than any claim in the parent application(s).

This application is related to U.S. Pat. No. 10,114,857, titled "Techniques For Performing Multi-System Computer Operations", filed Dec. 6, 2017, issued Oct. 30, 2018, the entire contents of which is hereby incorporated by reference as if fully set forth herein. This application is further related to U.S. Pat. No. 10,042,879, titled "Techniques For Dynamically Enriching And Propagating A Correlation Context", filed Dec. 6, 2017, issued Aug. 7, 2018, and to U.S. patent application Ser. No. 16/231,918, titled "Multi-System Operation Audit Log", filed Dec. 24, 2018.

FIELD OF THE INVENTION

The present invention relates to correlating information regarding user interactions with a web application and, more specifically, to correlating, from one or more different sources, both client-side and server-side information for interactions with a web application by one or more different users across one or more different devices.

BACKGROUND

It can be very useful to track and correlate information regarding user interactions with a web application, especially as the information relates to particular areas of interest of the web application. Examples of areas of interest of a web application include: offers of products or services (e.g., for a sales web application), offers of educational opportunities (e.g., for an education web application), sources of information (e.g., for a library web application), etc. User interaction information can be used to evaluate many aspects of the web application, including usability, profitability, and flow of user experience.

However, in order to get a comprehensive view of a user's interactions with a given web application, it is generally required to obtain information from multiple tracking mechanisms, such as browser cookies, web logs, other internal tracking mechanisms implemented by the web application (such as user authentication), third party analysis services, etc. It can be challenging to compile information from multiple sources to generate a comprehensive view of user interactions with a web application.

Third-party analysis services (such as Heap Analytics and Google Analytics) offer third-party tracking of client-side interactions between users and web applications, i.e., performed via a browser on a client device. However, these services generally associate user interaction information with tracking identifiers, which do not necessarily relate to user identifiers for the web application itself. Also, many times, third party analysis services track client-side activity by transmitting information about detected events to a repository via the Internet. However, some systems do not allow transmission of data to the analytics services, such as when such systems operate within a firewall. (The following references include information about Heap Analytics, the entire contents of each of which is hereby incorporated by reference as if fully set forth herein: heap.io/autocapture, and docs.heap.io/reference. Also, the following reference includes information regarding how Google Analytics uses cookies for user information tracking, the entire contents of which is hereby incorporated by reference as if fully set forth herein: www.bounteous.com/insights/2017/08/17/how-google-analytics-cookies-identify-users/.)

Moreover, not all information that pertains to a user's interactions with a web application is available at the client side. To illustrate, the following are examples of server-side information that does not become available at the client side: application of an A/B test that affects the look of a given user display; web application version; a policy that is used to determine an aspect of an area of interest presented to a given user (such as a credit policy used to determine an interest rate offered to the user); and other server-side operations of a backend system that affect user experience. According to an embodiment, an A/B test comprises two or more alternate versions of a particular aspect of a web application interface (such as alternate display characteristics, or alternate wordings on a graphical user interface) that are variously assigned to users that interact with the interface being tested, by which application developers test the performance of the alternative aspect versions.

Furthermore, the web application version with which a particular user interacts can affect many aspects of the user's experience with the web application, such as application flow, ordering of a set of questions that the web application presents to users, the number and/or ordering of steps/screens for areas of interest provided by the application, etc. For example, a first web application version requests a user's annual income at the first step of a loan application, and a second version of the web application defers the collection of annual income until the last step of the loan application. Tracking the web application version can provide insight into what may have affected a user's decisions with respect to interacting with the application.

Furthermore, some user interaction information may not be fully, or even partially, controlled by the web application. For example, A/B testing may be implemented and tracked by a third-party service. As a further example, a web application may rely on one or more other services (referred to herein as "secondary services") to fulfil roles regarding an offered area of interest. Such secondary services may track user interactions with identifiers that are specific to the secondary service. Additionally, a third-party analysis service may track user interactions with a secondary service, fulfilling a role for a given web application, using tracking identifiers that are likely to be distinct from any tracking identifiers used for the given web application.

With respect to user interaction tracking that is internal to a web application, it is not always practical to require a user to login before allowing any kind of user interaction with the application. For example, in order to make browsing more attractive, a web application that offers one or more products for sale may allow a user to explore the offered products prior to requiring any kind of user information. In such cases, the user activity that was performed without the user logging in is not associated with a web application-based user identifier.

Further complications arise from a user interacting with a given web application from multiple devices or even from multiple browsers on a single device. Security-motivated limitations are built into browsers in order to protect users from accidental or intentional data snooping. Thus, when a user engages with a particular application on more than one browser running on a given machine, or when a user interacts with the application via multiple devices, the tracking technologies generally record the user's activity under different identifiers for each browser and device being used. Also, because of the limitations placed on browser tracking capabilities, each application is only aware of the cookies that are set by the application itself.

User interaction tracking is even further complicated when a given client device is shared with multiple users (such as a home desktop or a shared computer that is located in a public place). In a shared-device situation, the tracking mechanisms being used by an application that is run on the shared device will generally identify all users as the same person until a current session for the application is recreated or destroyed, such as during application login/logout. As such, it can be difficult to properly attribute user activity, even on a single device, to the user that performed the activity on the device.

Thus, it would be beneficial to compile, from multiple sources, more comprehensive information regarding user interactions with web applications and associated supporting systems. More specifically, it would be beneficial to compile a more comprehensive view of user experience with a web application with respect to particular areas of interest for the application, even when users utilize multiple devices or when multiple users utilize a single device, without requiring the user activity to be performed while the user is logged in.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

In the drawings:

FIG. 2 depicts a flowchart for collecting information about a user, which information is associated with inconclusive identifiers, and associating that information with conclusive user identifiers.

DETAILED DESCRIPTION

Figure 1:
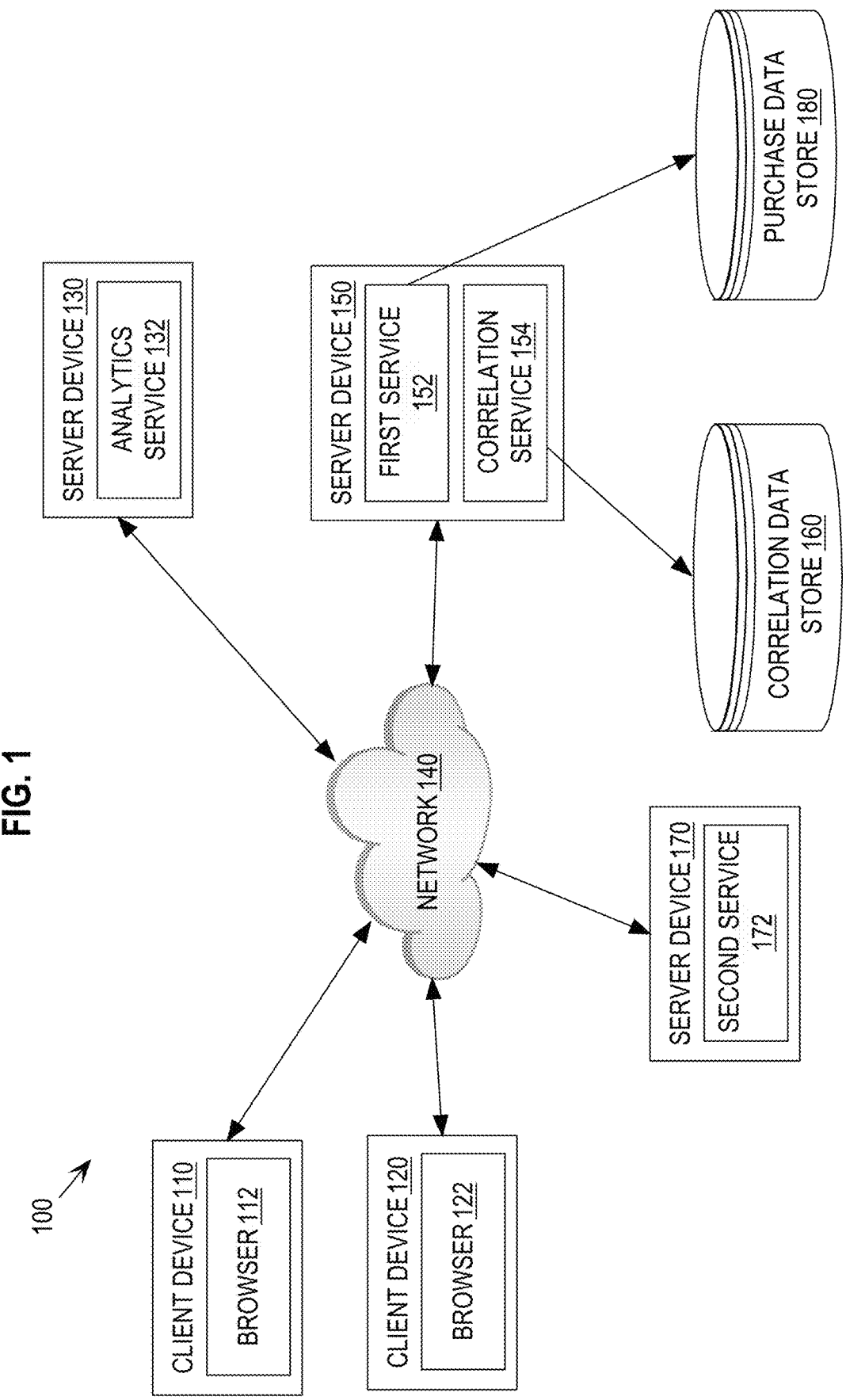
FIG. 1 depicts an example network arrangement.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

GENERAL OVERVIEW

In order to create a comprehensive view of user experiences with a given web application (referred to herein as the "main" web application), embodiments collect, from an event stream, user interaction records that have been generated based on multiple tracking sources. The user interaction records include both server-side and client-side information regarding user experiences with the main web application.

Because not all user interaction records are immediately attributable to conclusive identifiers, embodiments store the records in a data store, and then, as identifying data becomes available, embodiments retroactively correlate the stored records with conclusive identifiers. A conclusive identifier is a user identifier that is used in connection with the main web application, such as an identifier of a user profile for the main web application, or other information that uniquely identifies a person. User interaction records that are not immediately attributable to conclusive identifiers are generally associated with other identifiers (referred to herein as "inconclusive identifiers"), which do not identify a user in the context of the main web application, such as tracking identifiers from third-party analysis services, device identifiers, A/B testing identifiers used by an A/B testing framework, user identifiers for applications or services other than the main web application, IP addresses, client session identifiers, etc.

According to one or more embodiments, attribution of user interaction records to conclusive identifiers is based on one or more links that have been established between inconclusive identifiers and conclusive identifiers. Inconclusive identifiers are automatically linked to conclusive identifiers based on one or more linking user interaction records that conclusively identify the user, either directly or indirectly, and that are associated with an inconclusive identifier. For example, a particular linking record includes information for a user login event or includes identifying information that the user has input into a web form (such as an email address, phone number, name, conclusive identifier, etc.).

According to an embodiment, established identifier links are subject to one or more link removal criteria, including criteria based on: a timestamp of the most-recent linking record that associated the linked identifiers; whether any information in interaction records associated with the inconclusive identifier of the link is inconsistent with information in a user profile associated with the conclusive identifier of the link; whether a more-recent non-compatible link has been established, whether a new session identifier is found to be associated with a device identifier that was previously associated with a different session identifier, or whether a dissociative interaction record has been detected for the link. If link removal criteria is satisfied for any given established link, the link is broken. Once a link is broken, any interaction records, found in the data store, that are associated with the inconclusive identifier of the broken link are no longer associated with the conclusive identifier of the broken link.

According to an embodiment, each interaction record that is associated with a conclusive identifier based on an identifier link is assigned a confidence metric for the association. The confidence metric that is assigned to a given interaction record is based on one or more of the following confidence heuristics: a device-specific confidence heuristic that is based on a number of users that have been detected using a device associated with the record; a link-specific confidence heuristic that is based on whether an attribute value of the respective information item matches an attribute value in a user profile associated with the conclusive identifier; or a time-based confidence heuristic that is based on an amount of time between a timestamp of the record and a timestamp of an identifier link on which the association of the record and the conclusive identifier was based.

Generally, a user's journey from initial contact to engaging with a particular area of interest includes many phases that may be accomplished in a variety of ways, and it can be very challenging to capture information from all of the phases and then to attribute the captured information to the associated person without requiring the user to log in. Thus, embodiments further utilize interaction records that contain information regarding a particular area of interest to associate interaction records, stored in the data store, with associated areas of interest from the main web application. This allows for accurate retroactive tracking of a user's experience with exploration of the indicated area of interest, which becomes particularly valuable when the web application offers products or services for users to explore and purchase.

Once interaction records are correlated with conclusive user identifiers, analysis of the interaction records can help understand a particular user's experience with the web application, especially with respect to particular areas of interest that the user explored. For example, analysis of the interaction records for multiple users may indicate that the probability of an item getting clicked (such as a loan offer being selected) becomes lower the further down the position of the item is in a list of clickable items. As another example, analysis of the correlated interaction records indicates that a certain type of ad or the positioning of an ad causes an unusually low click-through rate for the ad. As yet another example, analysis of the correlated interaction records indicates that device constraints or user interface layouts contribute to lack of user interaction, e.g., users tend to not scroll through a screen with a list of offers to see if there are more offers than what the screen accommodates.

System Utilization

In order to generate a comprehensive view of a users' experiences with a main web application, embodiments collect user interaction records from multiple tracking sources via an event stream. The user interaction records record interactions with the web application itself, or with one or more third-party services that support the web application, via one or more client devices and/or one or more browser instances. To illustrate, FIG. 1 depicts an example network arrangement 100 that comprises client devices 110 and 120 and server devices 130, 150, and 170 communicatively coupled via a network 140. Client devices 110 and 120 are configured with browser applications 112 and 122, respectively, through which users of the devices may view and interact with content retrieved via network 140.

Server device 150 is configured with a first service 152, which is a "main" web application that offers one or more areas of interest—such as offers of product sales, online classes from one or more sources, sources of information, etc.—for user engagement. Server device 170 is configured with an example second service 172, which, according to the example depicted by network arrangement 100, is a third-party service that coordinates with first service 152 to perform a portion of actions required for a user to explore and/or engage with one or more areas of interest offerred by first service 152. Server device 130 is configured with an analytics service 132, which collects client-side information for user interactions with web pages provided by first service 152 and/or second service 172.

Interaction Records in a Correlation Data Store

A user may utilize example network arrangement 100 to interact with first service 152 to explore and potentially engage with a particular area of interest. For example, a user may explore one or more loan products offerred by first service 152 by seeking information regarding the first service, and the user may engage with the loan product by applying for the loan product and/or by accepting a personalized loan offer.

Interactions with first service 152, and other related services, generate client-side and server-side interaction records (as described in further detail below) that record aspects of the user interaction and experience. However, not all user interaction records are immediately attributable to conclusive identifiers, which identify the user with respect to first service 152 (e.g., a user identifier that is associated with a user profile in data maintained by first service 152, or other information that uniquely identifies a user, such as an address, phone number, full name, social security number, etc.). Thus, embodiments store such records in a data store, and then retroactively correlate the stored records with conclusive identifiers, as identifying data becomes available.

Accordingly, server device 150 is further configured with a correlation service 154, which stores interaction records from various sources and associates the stored interaction records (retroactively, as needed) with conclusive user identifiers. The retroactive association of interaction records with conclusive user identifiers allows a web application more flexibility in requiring user login, while still maintaining a comprehensive view of user experience. FIG. 2 depicts a flowchart 200 for collecting interaction records that record information about a user's experience with a particular web application, where the interaction records are associated with an inconclusive user identifier, and then associating the records with a conclusive user identifier.

Figure 3A:
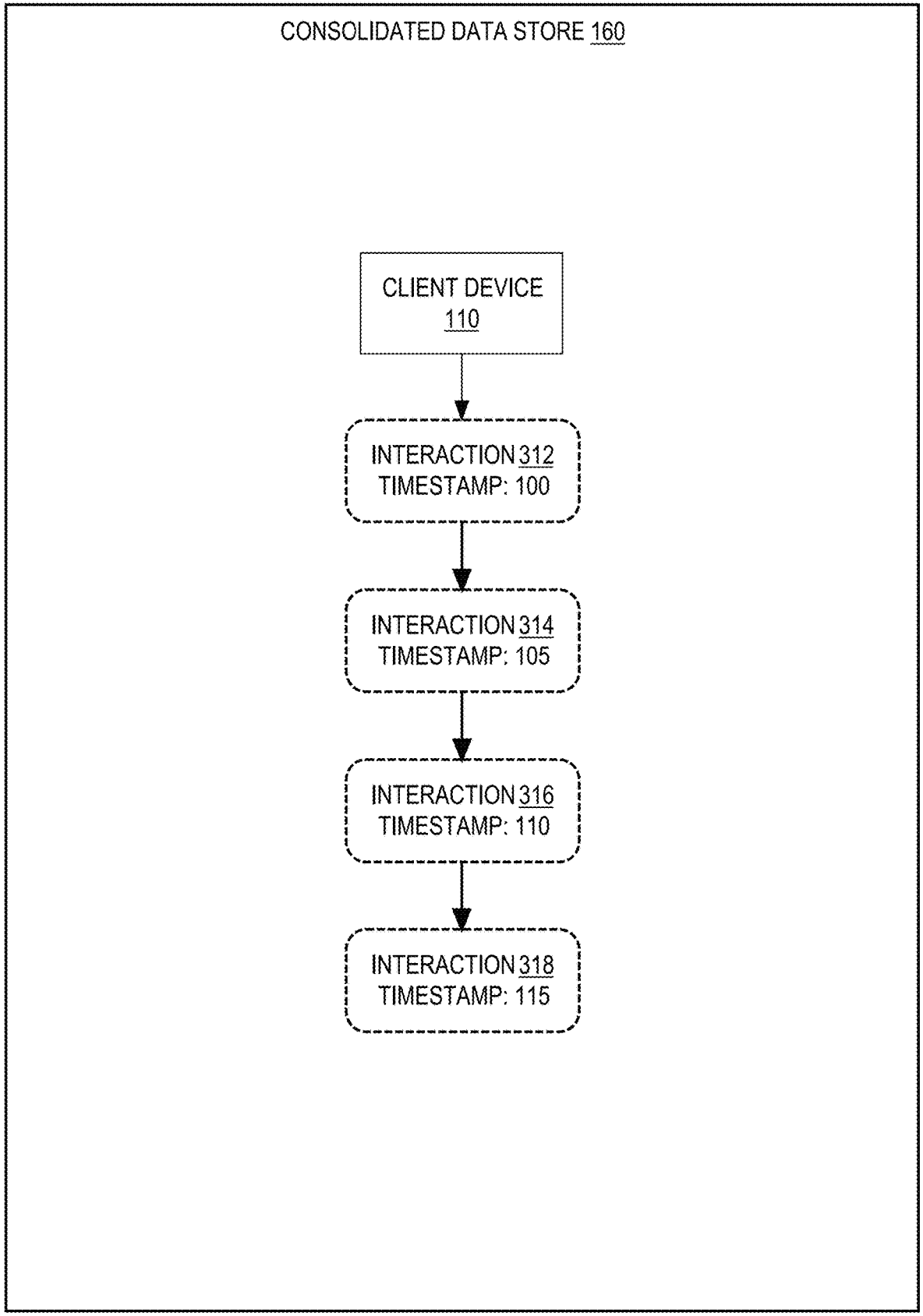
FIGS. 3A-F depict interaction records in a correlation data store.

At step 202 of flowchart 200, a particular plurality of information items that reflect interaction between one or more client devices and a server device are collected, where a particular set of one or more information items, of the particular plurality of information items, are associated with a particular inconclusive identifier. For example, as depicted in FIG. 3A, correlation service 154 stores, in correlation data store 160, a plurality of interaction records 312-318 that were generated based on user activity at client device 110 with respect to first service 152. According to the example of FIG. 3A, interaction records 312-318 were recorded without any user being authenticated first service 152 and, as such, are not associated with any conclusive user identifier. However, because each of interaction records 312-318 includes an identifier of client device 110, they are all associated in data store 160 with the inconclusive identifier of client device 110.

Each of interaction records 312-318 reflects information from one or more interactions between a user on client device 110 and first service 152. Such interaction records may represent any client-side or server-side aspect of a user's interaction with first service 152, including: a particular AB test option that was selected for a user on client device 110; a page to which a user on client device 110 navigated; user selection of a particular option from a web page (such as clicking on a graphical user interface element or otherwise communicating option selection) displayed at client device 110; details of user communication with customer service of the web application on client device 110; referral from external sites that initiate interaction with first service 152 or supporting systems; aggregation of various system responses (such as aggregation of loan offers from multiple providers that were presented to a user of client device 110); timing or positioning of display elements displayed at client device 110; whether interaction with first service 152 lead to referral to another site; etc.

The following is a non-limiting example of user interactions with first service 152, wherein first service 152 provides multiple areas of interest, e.g., multiple loan products for user consumption. Via browser 112 on client device 110, a first user initiates interaction with first service 152 at an example domain "firstservice.com" to explore a particular area of interest, e.g., an auto refinance loan, without being logged in. In the absence of a user identifier, first service 152 uses an identifier of client device 110, such as an IP address, to track user interaction data generated by the user's exploration of the product.

Also, analytics service 132 tracks the user's interactions with web pages from "firstservice.com", provided by first service 152, under an analytics identifier 'AA' that does not conclusively identify the user. For example, analytics service 132 sets cookies on client device 110 that record one or more of: URLs in domain "firstservice.com" visited by a user on client device 110; where a user on client device 110 clicked on the web pages; videos that a user on client device 110 watched; etc. All of these cookies are associated with timestamps, and also analytics service 132 timestamps each interaction tracked by the service.

The first user indicates, via a web page provided by first service 152, the desire to apply for the auto refinance loan. Without requiring the user to first log in, first service 152 engages second service 172 to perform a portion of the process of applying for the auto refinance loan, such as checking credit-worthiness. Accordingly, second service 172 serves one or more web pages to browser 112 through which the user provides the information needed to determine credit-worthiness. Though second service 172 does not have access to a conclusive identifier for the user, i.e., an identifier that conclusively identifies the user for first service 152, second service 172 creates a profile for the user using the credit check information that the user provided to the service, and with any other tracking information that second service 172 produced for the user, and indexes this profile with the user identifier 'X', which is an inconclusive identifier with respect to first service 152. After the first user provides the information needed to check credit-worthiness, the first user steps away from the computer and several hours pass without interaction with either first service 152 or second service 172.

Subsequently, a second user uses client device 110 to engage with first service 152 to investigate a personal loan product. Again, analytics service 132 tracks the second user's interactions with web pages, from "firstservice.com", provided by first service 152, under the same analytics tracking identifier 'AA'.

Furthermore, the first user thinks of additional information that she would like to know about the auto refinance loan, and visits a FAQ web page on "firstservice.com" from browser 122 on client device 120, which, for example, is the first user's mobile phone. Because these interactions are on a different device than client device 110, analytics service 132 tracks the first user's interactions with the web pages provided by first service 152 under analytics identifier 'AB', which is different than the analytics identifier used for client device 110.

Event Stream

According to an embodiment, correlation service 154 retrieves client-side and server-side interaction records from an event stream. As described in further detail below, this event stream is produced based on data that one or more services, feeding into the stream, store in their respective databases. The one or more services that feed into the stream, which include first service 152, either track user interaction data that pertains to first service 152 or retrieve, from other services, tracked user interaction data that pertains to first service 152. Because the data stored in the databases of the services that feed into the stream can include any kind of information that is pertinent to first service 152, the event stream includes server-side information regarding user experience, and also information for client-side interactions by the user done via any number of browsers or devices and recorded by any number of services.

Figure 4:
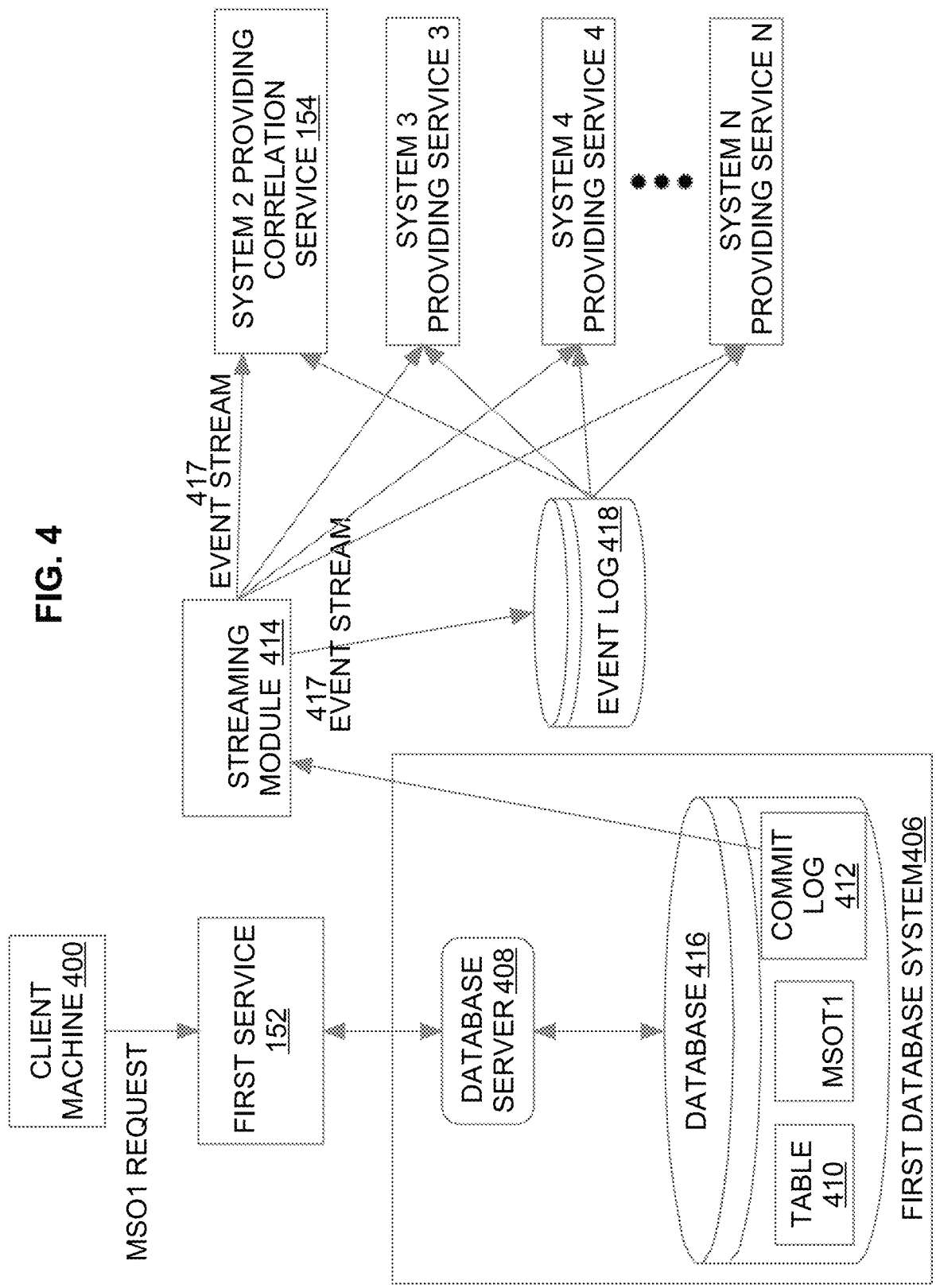
FIG. 4 is a block diagram that illustrates how an event stream from one system is fed to any number of additional systems, each providing a respective service.

To illustrate, correlation service 154 consumes an event stream 417 depicted in FIG. 4, which is a block diagram that illustrates how the event stream from one system's commit log, described in further detail below, can be fed to any number of additional systems (e.g. systems 2-N), each providing a respective service. In the example of FIG. 4, system 2 provides correlation service 154. Nevertheless, correlation service 154 may be provided by the same system as first service 152, or by a different system, according to one or more embodiments.

According to an embodiment, first service 152 (or another service that feeds into event stream 417) periodically obtains information from analytics service 132 and from second service 172, and stores the retrieved information in a purchase data store 180. For example, analytics service 132 provides a daily interaction data file summary that first service 152 downloads to purchase data store 180. As another example, first service 152 periodically calls second service 172 via an established API endpoint to provide interaction data, and stores the interaction data in data store 180. As yet another example, one or more crawlers are scheduled to periodically inspect web logs or application server logs for first service 152 and/or supporting systems and then store entries of interest to data store 180.

To illustrate in the context of FIG. 4, first service 152 stores information retrieved from analytics service 132 and/or second service 172 by sending commands to a database server 408 to cause first database system 406 to store the retrieved data to purchase data store 180, stored in table 410, as part of a first database transaction (TX1). When the first transaction TX1 commits, commit records for the first transaction are stored in a first commit log 412 of the first database system 406. Consequently, upon commit of the first transaction TX1, all changes made by the first transaction (including those made to table 410) will be reflected in commit records. Thus, the update values of the commit records of the first transaction TX1 will include the information retrieved by first service 152.

A streaming module 414 reads the commit log 412 of the first database system 406, and generates event stream 417 therefrom. Correlation service 154 reads and analyzes event stream 417 (either directly or after the stream has been stored as an event log 418) to identify any information items that reflect user experience with first service 152. According to an embodiment, each row in table 410 has a designated column that holds key-value pairs (e.g., in JSON format) that represent respective events, with the identifiers included in the events appearing as one or more of the keys. These key-value pairs are included in the event records in event stream 417. An event stream handler of correlation service 154 is designed to either recognize certain keys (only process known identifiers) or ignore certain keys (for example, assume every key is an identifier unless it is called "payload", which describes the interaction being represented by the event record). According to an embodiment, correlation service 154 determines that events, in event stream 417, are interaction records to be correlated based, at least in part, on keys of the events being included in a list of interaction-type keys that are maintained by correlation service 154.

Continuing with the example involving the first and second users exploring products offered by first service 152 described above, event stream 417 will include one or more interaction records that record information retrieved from analytics service 132 and second service 172, which include records associated with the inconclusive identifiers of client device 110 and one or more analytics tracking identifiers. Accordingly, correlation service 154 pulls the pertinent event records out of event stream 417 and stores the records as interaction records in correlation data store 160, such as the interaction records depicted as stored in data store 160 in FIGS. 3A-3F.

Retroactively Attributing Stored Interaction Records to Conclusive User Identifiers Some of the interaction records that correlation service 154 stores in data store 160 are explicitly associated with conclusive identifiers, such as login events and interaction records that were created while a user is logged into first service 152. Because these interaction records are explicitly associated with conclusive user identifiers, correlation service 154 automatically associates these records with the indicated conclusive identifiers in data store 160.

Others of the interaction records that correlation service 154 stores in data store 160 are not explicitly associated with any conclusive identifier, but are instead associated with one or more inconclusive identifiers. Correlation service 154 automatically associates such records with the indicated inconclusive identifiers in data store 160. According to one or more embodiments, the interaction records that are not attributed to a conclusive identifier in data store 160 are retroactively attributed to conclusive identifiers based, at least in part, on interaction records that link an inconclusive identifier with a conclusive identifier, referred to herein as "linking" interaction records.

Because users almost always have to identify themselves in the course of exploring an area of interest in which the user wishes to engage, linking records will periodically appear to attach user activity to conclusive user identifiers. According to one or more embodiments, a linking interaction record includes two different identifiers, such as a conclusive identifier and an inconclusive identifier, two inconclusive identifiers, a conclusive identifier and an area of interest (AOI) identifier, etc. For example, a linking user interaction record records a user login to first service 152, or records identifying information that a user has input into a web form (such as an email address, phone number, name, conclusive identifier, etc.), which causes the linking record to include a conclusive user identifier. As another example, a conclusive identifier is prepared in a lead generation database based on a direct mail campaign, where the conclusive identifier conclusively identifies the user based on the user's credit data that was gathered as a result of the direct mail campaign. Subsequently, the user converts to a customer, which involves creating a profile with first service 152, where the profile includes the credit data and the conclusive identifier used for the direct mail campaign. The record of the profile creation is a linking record that includes both the conclusive identifier of the user for the direct mail campaign and the conclusive identifier for first service 152 that identifies the user's new profile.

Returning to the discussion of flowchart 200 of FIG. 2, at step 204, it is determined that a particular information item, of the particular plurality of information items, (a) is associated with the particular set of one or more information items, and (b) includes a conclusive identifier that identifies a particular person. For example, after storing interaction records 312-318 in data store 160, correlation service 154 identifies a linking interaction record, from event stream 417, with information about a login event that includes both an identifier of client device 110 and user identifier 330, where user identifier 330 identifies a user profile in first service 152.

Linking Identifiers

According to an embodiment, correlation service 154 uses linking interaction records to establish links between identifiers, including inconclusive identifiers, conclusive identifiers, and AOI identifiers. Based on established identifier links, correlation service 154 uses inconclusive identifiers in interaction records, stored in data store 160, to retroactively associate the interaction records with applicable conclusive identifiers and applicable AOI identifiers.

Furthermore, correlation service 154 uses interaction records that link two inconclusive identifiers to establish links between the inconclusive identifiers. While a link between inconclusive identifier A and inconclusive identifier B is established, if correlation service 154 establishes a link between inconclusive identifier A and a particular conclusive identifier, then, based on the link between inconclusive identifiers A and B, correlation service 154 automatically also links the inconclusive identifier B to the particular conclusive identifier.

Figure 3B:
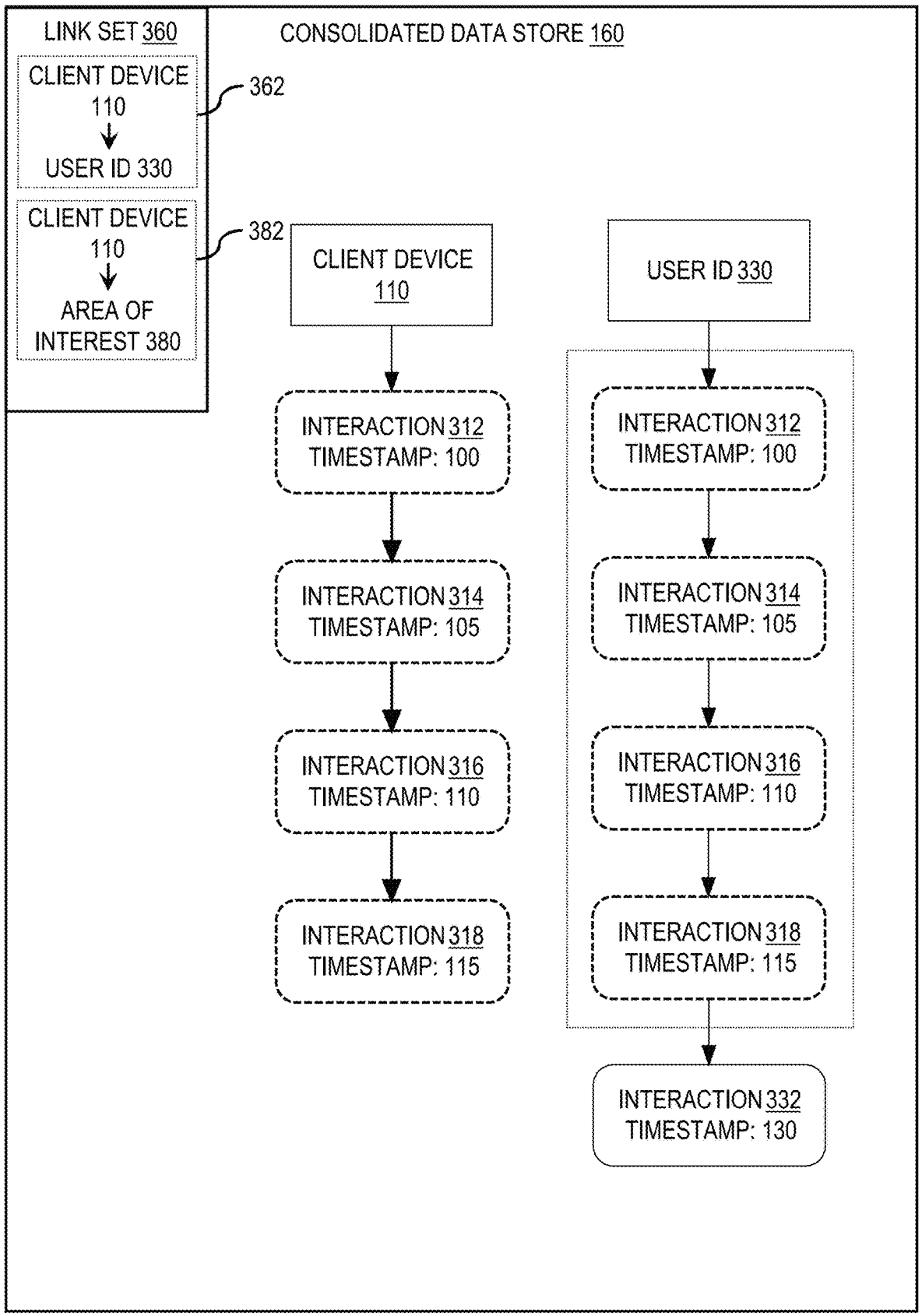

For example, correlation service 154 identifies a linking interaction record, from event stream 417, with information about a login event that includes both an identifier of client device 110 and conclusive user identifier 330. In response to identifying this linking interaction record, correlation service 154 automatically creates a link 362, in a link set 360 in correlation data store 160, that links the inconclusive identifier of client device 110 to conclusive user identifier 330, as depicted in FIG. 3B.

According to an embodiment, upon establishing a link in link set 360 that links a conclusive identifier to an inconclusive identifier (such as link 362), correlation service 154 automatically attributes one or more stored interaction records, associated with the inconclusive identifier, to the conclusive identifier. To illustrate, in response to establishing link 362, correlation service 154 automatically scans the interaction records stored in correlation data store 160 to determine whether any of the records are associated with the inconclusive identifier of client device 110. According to an embodiment, each identifier (conclusive or not) is associated with a set of one or more event rows, with the identifier marked as a lookup key for the rows. In this embodiment, the scanning is performed by searching all rows with the same identifier as the lookup key. As depicted in FIG. 3B, interaction records 312-318 are associated with the inconclusive identifier for client device 110 in data store 160 at the time of establishing link 362. Based on link 362, correlation service 154 associates interaction records 312-318 with user identifier 330, which is the conclusive identifier of link 362.

After interaction records 312-318 are associated with user identifier 330, correlation service 154 retrieves an interaction record 332, from event stream 417, which records an interaction with first service 152 from client device 110. If interaction record 332 includes user identifier 330, then correlation service 154 automatically attributes interaction record 332 to user identifier 330 in data store 160, as depicted in FIG. 3B. However, if interaction record 332 does not include user identifier 330, but includes the inconclusive identifier of client device 110, then based on link 362, correlation service 154 automatically attributes interaction record 332 to user identifier 330 in data store 160, as depicted in FIG. 3B.

According to an embodiment, interaction records 312-318 record client-side interactions with first service 152, which are detected via browser 112. According to another embodiment, one or more of interaction records 312-318 record server-side activities, which had no connection with browser 112, such as a particular algorithm that was applied for the user on client device 110 during the session with first service 152.

Area of Interest Identifier Linking

When first service 152 offers areas of interest for users to engage with, and ultimately commit to (such as via a purchase order), interaction records may generally be attributed to one or more of the areas of interest. User experience with the different areas of interest may vary substantially. Thus, correlating the gathered information with associated areas of interest can allow for analysis of correlated information with respect to the pertinent interest areas, creating more in-depth insight into a user's journey with exploring offered areas of interest.

As such, according to an embodiment, correlation service 154 creates links, e.g., in link set 360, between (a) inconclusive identifiers and/or conclusive identifiers, and (b) area of interest (AOI) identifiers. These links are based on linking records that associate particular AOI identifiers with either inconclusive or conclusive identifiers, such as a record that includes the inconclusive identifier of client device 110 and a web log entry indicating a web page for a particular AOI 380, e.g., a particular loan product.

To illustrate, correlation service 154 identifies a linking record that links the inconclusive identifier of client device 110 and an identifier of AOI 380. Based on the linking record, correlation service 154 creates a link 382 in link set 360 that associates the inconclusive identifier of client device 110 and the identifier of AOI 380, as depicted in FIG. 3B. Correlation service 154 includes the timestamp of the linking record in the record of link 382 as the timestamp of the link. According to an embodiment, while link 382 is established, correlation service 154 associates the identifier of AOI 380 with the interaction records, associated in data store 160, with the identifier linked to AOI 380 (the identifier of client device 110) having timestamps after the timestamp of the link. Thus, correlation service 154 associates interaction records themselves with AOI identifiers based on links between conclusive or inconclusive identifiers and AOI identifiers.

Interleaved Interaction Records

Figure 3C:
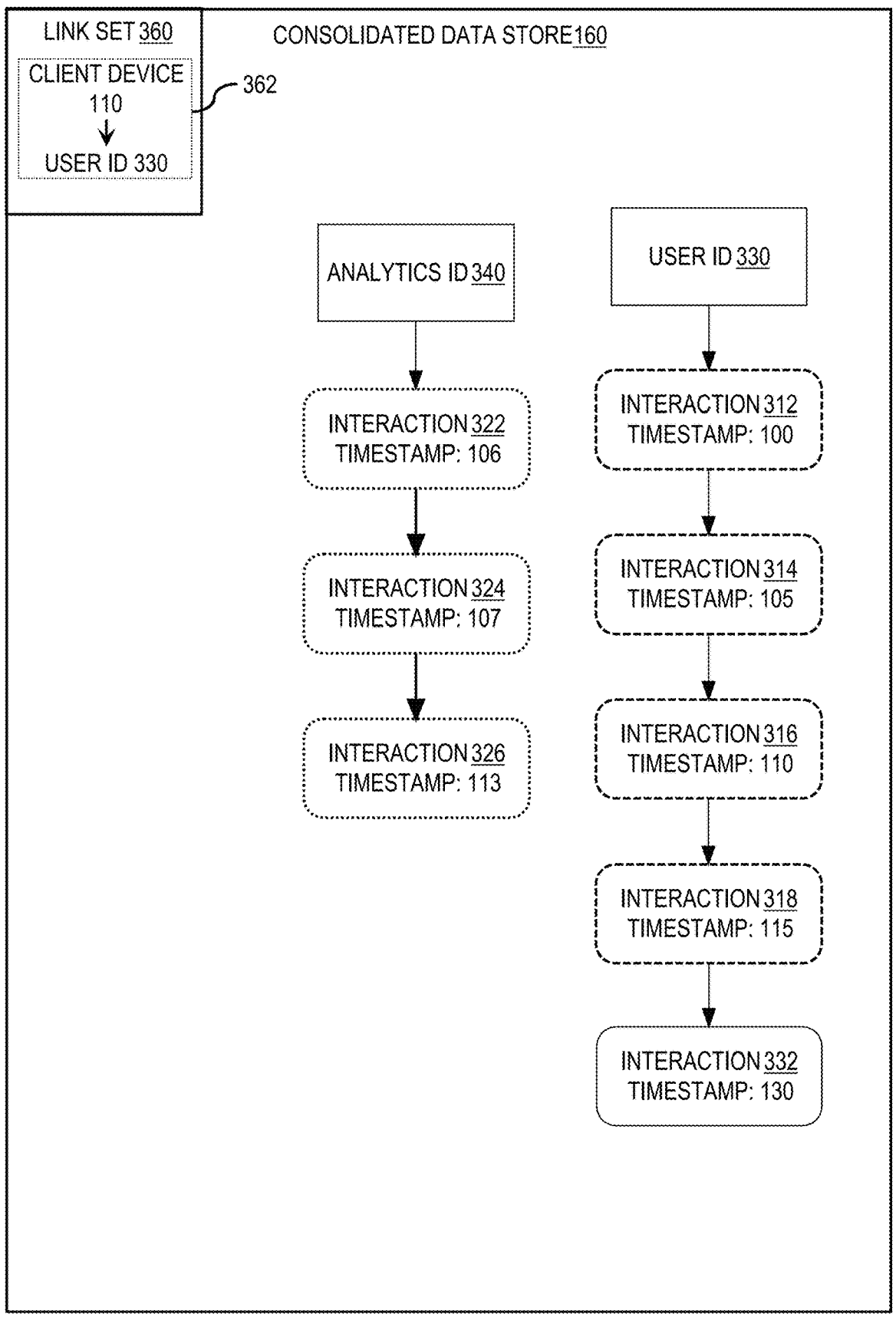
Figure 3D:
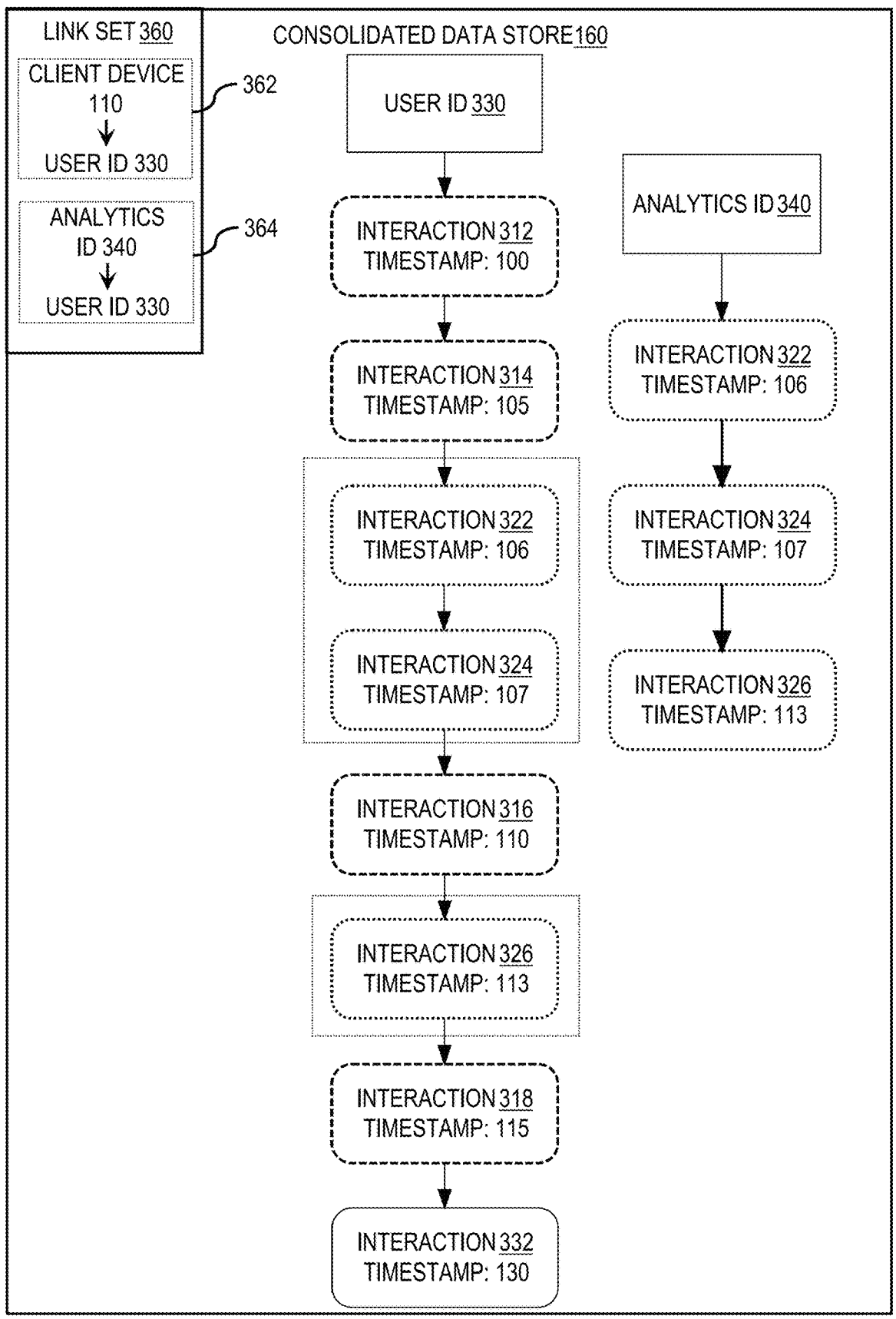

As a further example depicted in FIG. 3C, correlation service 154 retrieves, from event stream 417, interaction records 322-326 with information recorded by analytics service 132 under an analytics identifier 340 based on interactions between a user at client device 110 and first service 152. Because analytics identifier 340 does not identify a user profile for first service 152, analytics identifier 340 is an inconclusive identifier. After storing interaction records 322-326 in data store 160, correlation service 154 identifies a linking interaction record that links analytics identifier 340 with user identifier 330. As depicted in FIG. 3D, based on the linking interaction record, correlation service 154 creates a link 364, in link set 360, that links inconclusive analytics identifier 340 and conclusive user identifier 330.

Based on link 364, correlation service 154 automatically attributes interaction records 322-326, stored in data store 160, to user identifier 330. Specifically, as depicted in FIG. 3D, correlation service 154 stores the interaction records that have been associated with user identifier 330 in temporal order, which, based on the timestamps of the interaction records, results in interleaving the records already associated with user identifier 330 (i.e., interaction records 312-318 and 332) with interaction records 322-326.

As a further example, not depicted in FIG. 3D, correlation service 154 retrieves, from event stream 417, one or more interaction records that record information for interactions between a user at client device 120 and first service 152. In the absence of a link between client device 120 and a conclusive identifier, correlation service 154 stores the one or more interaction records in data store 160 associated with the inconclusive identifier for client device 120.

Subsequently, correlation service 154 identifies a linking interaction record that links client device 120 with user identifier 330. Accordingly, correlation service 154 establishes a link, in link set 360, that links the inconclusive identifier for client device 120 and user identifier 330. Based on this link, correlation service 154 scans data store 160 to identify any interaction records that are associated with the inconclusive identifier for client device 120 and associates those records with user identifier 330. Inasmuch as the timestamps of the records associated with client device 120 mark times that occur between times marked by timestamps of the records already associated with user identifier 330, correlation service 154 interleaves the records that are associated with client device 120 among the records that were previously associated with user identifier 330.

Link Removal Criteria

Links between identifiers that are accurate at one time may eventually cease to be accurate. For example, multiple different users utilize client device 110 to access first service 152. In this example, the first person logs into first service 152, resulting in correlation service 154 storing a link that associates a conclusive user identifier of the first person with the identifier of client device 110. Subsequently the second person accesses first service 152. At this point, the link between the conclusive user identifier of the first person and the identifier of client device 110 is no longer accurate because, once the second person accesses first service 152, the interaction records that are associated with client device 110 are no longer properly attributed to the first user.

Thus, according to an embodiment, established links (e.g., in link set 360) are subject to one or more link removal criteria where, if applicable link removal criteria is satisfied for any given established link, the link is broken. Application of link removal criteria to established links increases the likelihood of the established links being accurate. Once a link is broken, it is no longer "established" such that correlation service 154 no longer associates interaction records with the conclusive identifier of the broken link based on that link.

According to one or more embodiments, the one or more link removal criteria applied by correlation service 154 include criteria based on one or more of: a timestamp of the most-recent linking record for the link; whether any information in interaction records associated with the inconclusive identifier of the link is inconsistent with information in a user profile associated with the conclusive identifier of the link; whether a later non-compatible link has been established; whether a new session identifier is found to be associated with a device identifier that was previously associated with a different session identifier; or whether a dissociative interaction record has been detected for the link.

Time-Based Link Removal Criteria

According to an embodiment, correlation service 154 applies link removal criteria, to link 362, based on a timestamp of the most-recent linking record for the link. For example, in the link record for link 362, correlation service 154 stores the timestamp from the interaction record on which link 362 was most-recently based. To illustrate, the interaction record with information about the login event that includes both an identifier of client device 110 and user identifier 330 on which link 362 was based had a timestamp of '120'. Thus, the link record for link 362 includes the timestamp '120'. Any time an additional linking record is detected that links the identifier of client device 110 and user identifier 330, correlation service 154 updates the timestamp in the record of link 362.

In this embodiment, correlation service 154 maintains a configurable parameter indicating a threshold amount of time, such as 50 time units, that a given link should be applied based on the timestamp of the link record. Accordingly, when the timestamp of link 362 is '120', correlation service 154 applies link 362 to associate interaction records that have timestamps between '70' and '170' with user identifier 330. Further, based on the threshold amount of time, once correlation service 154 determines that an applicable system clock has moved past '170', and the timestamp of link 362 is '120', correlation service 154 automatically breaks link 362.

Consistency-Based Link Removal Criteria

According to an embodiment, correlation service 154 applies link removal criteria, to links in link set 360, based on whether any information in interaction records associated with the inconclusive identifier of the link is inconsistent with information in a user profile associated with the conclusive identifier of the link. For example, upon establishing a new link in link set 360 that links a conclusive identifier to an inconclusive identifier (such as link 362), correlation service 154 scans the interaction records stored in correlation data store 160 to attribute interaction records, having the inconclusive identifier, to the conclusive identifier.

According to an embodiment, as each interaction record with the inconclusive identifier is detected by correlation service 154, correlation service 154 extracts information from the record and stores the information in a temporary data profile for link 362. Periodically, correlation service 154 scans the temporary data profile for link 362 and compares attributes in the temporary data profile with attributes in the user profile that is identified by user identifier 330. Upon determining that information in the temporary data profile for link 362 contradicts one or more attributes in the user profile identified by user identifier 330, correlation service 154 automatically disassociates the interaction record storing the contradictory information from user identifier 330. Further, correlation service 154 dissociates all interaction records that have been attributed to user identifier 330 based on link 362 that have timestamps that are more advanced than the timestamp of the contradictory record. Correlation service 154 also automatically breaks link 362 based on satisfaction of the link removal criteria.

According to an embodiment, this link removal criteria is satisfied when an interaction record that is associated with the inconclusive identifier of the link contradicts information stored in a set of key attributes in the user profile. The set of key user profile attributes includes attributes that identify the user, contradiction of which would indicate that the user being described is not the user in the user profile, such as social security number, last name, first name, middle name, phone number, address, user identifier, etc.

Compatibility-Based Link Removal Criteria

According to an embodiment, correlation service 154 applies link removal criteria, to the links in link set 360, based on whether a later non-compatible link has been established in the link set. Examples of non-compatible links include a first link between a conclusive identifier and a particular inconclusive identifier, and a second link between a different conclusive identifier with the same particular inconclusive identifier. According to an embodiment, incompatible links are both broken (such as in the case of the inconclusive identifier being a session identifier or an analytics identifier, which should pertain to only one user). According to another embodiment, detection of a later incompatible link automatically breaks the earlier incompatible link in favor of the later link (such as in the case of the inconclusive identifier being a device identifier, which may pertain to multiple users).

To illustrate incompatible links, while link 364 is established in link set 360, correlation service 154 identifies a linking record that links a second user identifier (other than user identifier 330) to analytics identifier 340. In this case, correlation service 154 breaks link 364 and does not establish a link between the second user identifier and analytics identifier 340. As another example, while link 362 is established in link set 360, correlation service 154 identifies a linking record that links a second user identifier (other than user identifier 330) to client device 110. In this case, correlation service 154 automatically breaks link 362 and establishes a new link, in link set 360, between the second user identifier and client device 110. According to an embodiment, any interaction record with an identifier of client device 110 and a timestamp after the timestamp of the new link is associated, in data store 160, with the second user identifier based on the new link.

Session-Based Link Removal Criteria

According to an embodiment, correlation service 154 applies link removal criteria, to links in link set 360, based on whether a new session identifier is found to be associated with a device identifier that was previously associated with a different session identifier. Establishing a new session is one of the first things that a browser does upon visiting a new web application. The session identifier of the new session is generally sent to both the web application and analytics services servicing the web application. As such, the start of a new session is convincing evidence of the potential of a new user using the client device on which the session is established. Also, because session identifiers are generally associated with a single user, detection of a session identifier associated with a given client device when there is a link previously associating the client device with a different session identifier is evidence that a different user is using the client device.

Figure 3E:
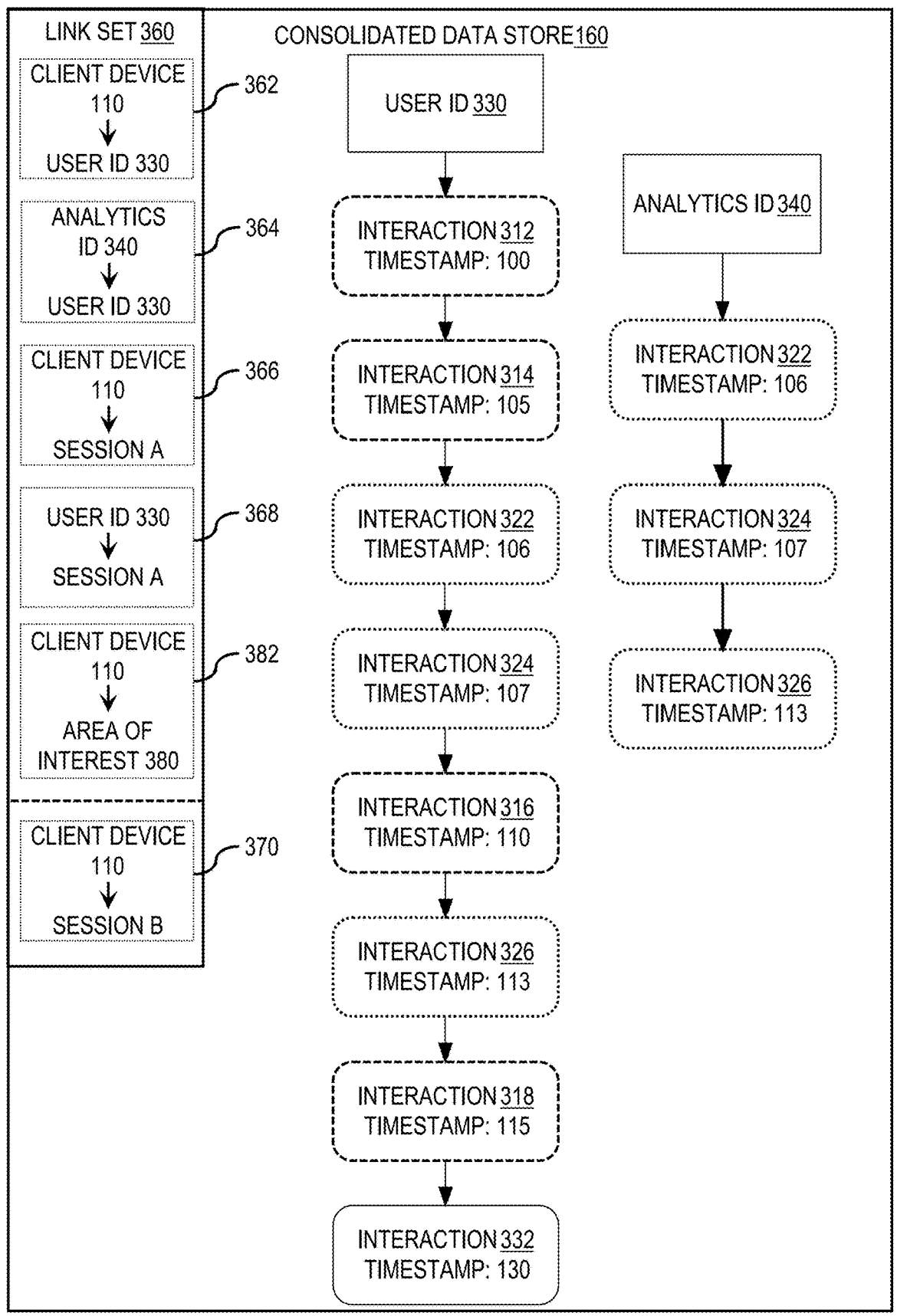

To illustrate, as shown in in FIG. 3E, in addition to link 362 between client device 110 and user identifier 330 and link 382 between client device 110 and AOI 380, correlation service 154 also establishes a link 366 between client device 110 and an inconclusive identifier for a session A based on a detected linking record that links the two inconclusive identifiers. As described above, correlation service 154 also establishes a link 368 between the inconclusive identifier for session A and user identifier 330 based on link 362 and link 366.

Further, while links 362, 366, and 382 are established, correlation service 154 detects a second linking record that links client device 110 with a second session B. Based on this second linking record, and correlation service 154 automatically establishes a link 370 between client device 110 and second session B. In response to establishing link 370, which is incompatible with link 366, correlation service 154 determines that the compatibility-based link removal criteria is satisfied and, accordingly, correlation service 154 automatically breaks links 362, 366, 368, and 382. Specifically, the establishment of a new session on client device 110 is evidence that the previous session is no longer established on client device 110, and that a user other than the user identified by user identifier 330 is using client device 110. The new user may not be exploring AOI 380, thus link 382 is also broken based on the link removal criteria.

Furthermore, it is possible that information with a new session identifier may have a later timestamp than a login event that associates the user using the new session with the device on which the session is established. In this case, correlation service 154 may establish a link between the user identifier of that user and an identifier of the client device before making the association between the session identifier and the identifier of the client device. Thus, according to an embodiment, in the case of a different session identifier being found for a client device, if a link between the identifier of the client device and a user identifier has a timestamp that marks a time within a threshold amount of time (such as one minute) of the timestamp of the linking record indicating the new session identifier for the client device, then the link between the identifier of the client device and the user identifier is not broken, given that the identified user is likely to be the user of the new session.

Dissociative Event-Based Link Removal Criteria

According to an embodiment, correlation service 154 applies link removal criteria, to links in link set 360, based on whether a dissociative interaction record has been detected. A "dissociative" interaction record is a record that indicates a break between two identifiers, such as a record indicating a user logout from first service 152, a timeout of a session established for first service 152 or for second service 172, etc. In the case of an AOI-based link, a dissociative interaction record may be a record that associates the identifier, which was associated with a given AOI identifier in a link in link set 360, with a different area of interest. Upon detecting a dissociative interaction record, correlation service 154 automatically breaks the link that associated the identifiers indicated in the dissociative interaction record.

Figure 3F:
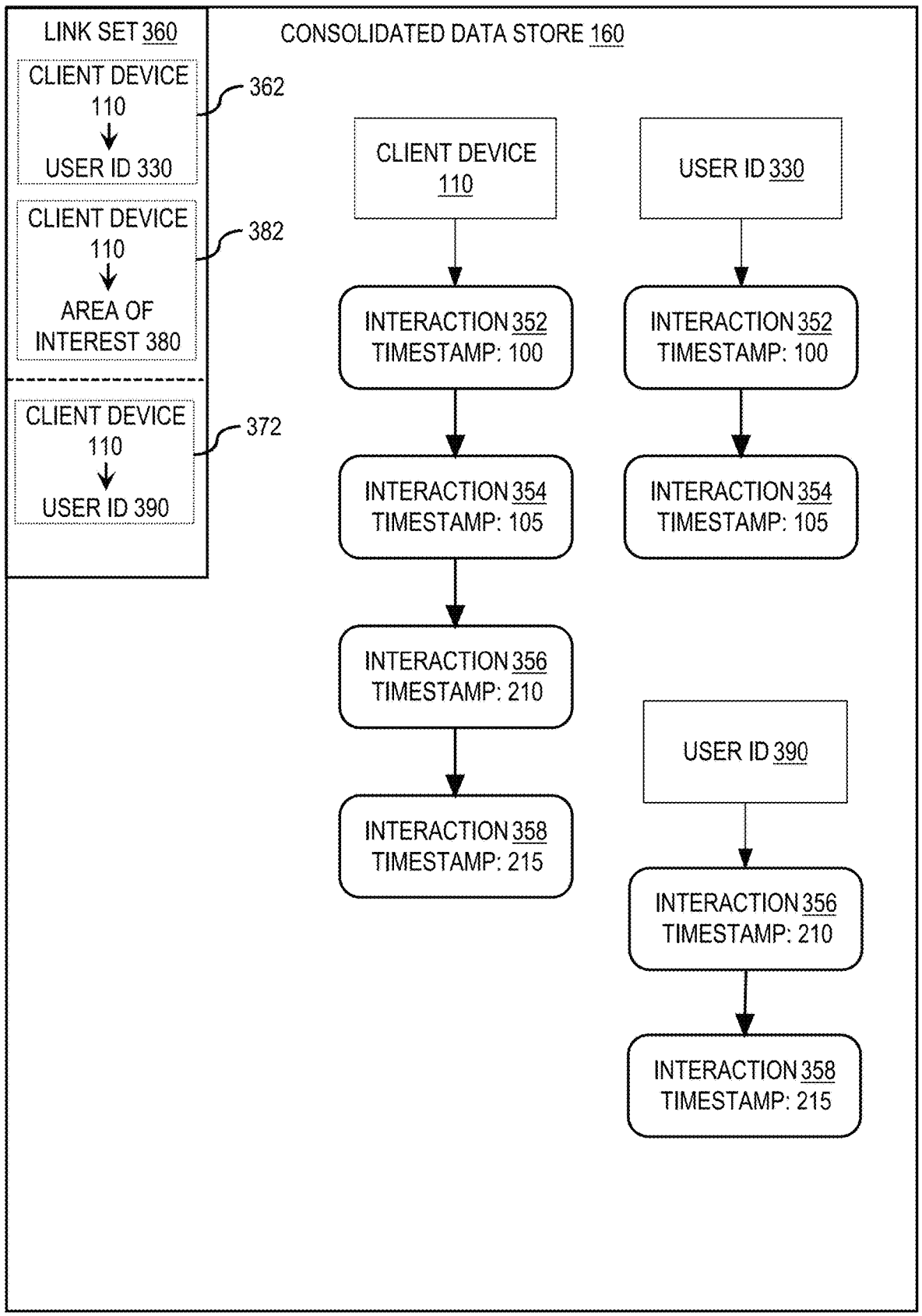

For example, FIG. 3F depicts interaction records 352-358 created by two different users exploring products offered by first service 152. According to an embodiment, correlation service 154 retrieves interaction records 352-358 from event stream 417, and stores the records in data store 160. Each of the interaction records are associated with the inconclusive identifier of client device 110.

Correlation service 154 detects a linking record with a timestamp '102', which links the inconclusive identifier of client device 110 with the conclusive user identifier 330 and also with AOI 380. Based on this linking record, correlation service 154 establishes link 362 in link set 360, where link 362 links the inconclusive identifier of client device 110 with the conclusive user identifier 330, and also establishes link 382 in link set 360, where link 382 links the inconclusive identifier of client device 110 and the identifier of AOI 380. Based on link 362, correlation service 154 automatically associates interaction record 352 (retroactively) and interaction record 354 with user identifier 330. Further, based on link 382, correlation service 154 automatically associates each of interaction records 352 and 354 with an identifier of AOI 380.

Correlation service 154 further determines that interaction record 354 is a logout record indicating that the user identified by user identifier 330 has logged out of first service 152 at client device 110. Because interaction record 354 is a logout record, it is a "dissociative" record for all links that involve the inconclusive identifier of client device 110. Based on determining that interaction record 354 is a "dissociative" record for the identifier of client device 110, correlation service 154 automatically breaks the links in link set 360 involving the identifier of client device 110, i.e., links 362 and 382.

Furthermore, as depicted in FIG. 3F, correlation service 154 detects a second linking record with a timestamp of '200', where the second linking record associates the inconclusive identifier of client device 110 with a second conclusive user identifier, i.e., user identifier 390. Based on this linking record, correlation service 154 establishes link 372 in link set 360 (which now does not include links 362 and 382), where link 372 has a timestamp '200' and links the inconclusive identifier of client device 110 with the conclusive user identifier 390.

Based on link 372, correlation service 154 associates interaction records 356 and 358, in data store 160, with conclusive user identifier 390. Also, because link 382 between AOI 380 and client device 110 was broken by a record having a timestamp ('105') previous to the timestamps of interaction records 356 ('210') and 358 ('215'), interaction records 356 and 358 are not associated with the identifier of AOI 380. Interaction records 352 and 354 remain associated with user identifier 330 because the timestamps of these records fall before the timestamp of link 372.

Confidence Metrics

According to an embodiment, each interaction record that is associated with a conclusive identifier (referred to herein as a conclusively-identified interaction ("CI-I") record) is associated with a confidence metric for the association with the conclusive identifier. A confidence metric for a given CI-I record measures the likelihood that the association between the conclusive identifier and the CI-I record is correct, and may be represented in any way, including as a percentage value.

The confidence metric for a given CI-I record is based on one or more of the following confidence heuristics: a time-based confidence heuristic that is based on an amount of time between the timestamp of the most-recent linking record on which the applicable identifier link was based and the timestamp of the CI-I record; a device-specific confidence heuristic that is based on a number of users that have been detected using a device associated with the given CI-I record; or a link-specific confidence heuristic that is based on how well information from the CI-I record matches with information from the user profile identified by the associated conclusive identifier.

Time-Based Confidence Heuristic

Each CI-I record is associated with a timestamp that marks a time at which the information in the CI-I record was generated. The farther away in time that a CI-I record originated with respect to the timestamp of the link on which the conclusive identifier association for the CI-I record was based (i.e., the "associated link"), the less likely that the CI-I record is properly attributed to the conclusive identifier. Thus, according to an embodiment, correlation service 154 assigns a confidence metric to each CI-I record in data store 160 that is based on the amount of time between a time marked by a timestamp of a CI-I record and a time marked by a timestamp of the associated link.

Specifically, as the length of time between the timestamp of a CI-I record and the timestamp of the associated link increases, the likelihood of proper attribution of the conclusive identifier to the CI-I record is lessened. According to an embodiment, this heuristic is further tied to the configurable parameter indicating a threshold amount of time that a given link should be applied, used in connection with the link removal criteria described above. To illustrate, correlation service 154 applies the following heuristic formula to determine a time-based confidence metric for a given CI-I record: reduce the confidence metric of the CI-I record by half for every minute that has passed between the timestamp of the CI-I record and the timestamp of the associated link.

For example, confidence metrics for CI-I records are represented as numbers from 0 to 100, where 0 is no confidence in the association between the CI-I record and the associated conclusive identifier and 100 is full confidence in the association. For a given CI-I record with a timestamp of '80' (where the timestamps represent a number of seconds that have passed since a $0^{th}$ second) and an associated link with a timestamp of '110', correlation service 154 applies the time-based confidence heuristic to calculate a confidence metric for the CI-I record as follows: (a) the confidence metric of the CI-I record is initialized to 100; (b) it is determined that there are 30 seconds between the timestamp of the CI-I record and the timestamp of the associated link; (c) because the time difference is less than 60 seconds, the time-based confidence heuristic for the CI-I record is 100%; and (d) the resulting confidence metric for the CI-I record is 100% of 100=100.

As a further example, for a second CI-I record with a timestamp of '230' and an associated link with a timestamp of '110', correlation service 154 applies the time-based confidence heuristic to calculate a confidence metric for the second CI-I record as follows: (a) the confidence metric of the second CI-I record is initialized to 100; (b) it is determined that there are 120 seconds between the timestamp of the second CI-I record and the timestamp of the associated link; (c) based on the time difference, the time-based confidence heuristic for the second CI-I record is 25% (reduced by half twice); and (d) the resulting confidence metric for the second CI-I record is 25% of 100=25.

Device-Specific Confidence Heuristic

According to an embodiment, correlation service 154 applies a device-specific confidence heuristic to each CI-I record in data store 160. Specifically, for each individual device for which correlation service 154 has received information, i.e., via interaction records, correlation service 154 maintains a record of a number of different conclusive identifiers that have been linked to an identifier of the device. This information is used to formulate a device-specific confidence heuristic for each device, where application of the device-specific heuristic, to a confidence metric for a given CI-I record that is associated with the device identifier, increasingly weakens the confidence metric as the number of different conclusive user identifiers that have been associated with the identifier of the device increases. According to an embodiment, correlation service 154 only considers the number of conclusive identifiers that have been associated with a given device over a particular period of time, e.g., during the last week.

To illustrate, correlation service 154 applies the following formula to determine a device-specific confidence heuristic for a given device: $1/X$, where X is the number of conclusive identifiers that have been linked to the inconclusive identifier of the device over the pertinent period of time. Using this formula, correlation service 154 assigns to client device 110, for which only one user has been detected over the pertinent time period, a device-specific confidence heuristic of $1/1=100\%$. This heuristic reflects the intuition that if only one user is connected to client device 110 in data store 160, then it is much more likely that any activity from client device 110 is attributable to that user. As such, application of the device-specific confidence heuristic for client device 110 to a confidence metric for a given CI-I record that is associated with an identifier of client device 110 leaves the confidence metric at its previous value without diminution.

As a further example, twenty different user identifiers have been associated with client device 120 in data store 160 over the pertinent time period. Using the above formula, correlation service 154 assigns, to client device 120, a device-specific confidence heuristic of $1/20=5\%$. This heuristic reflects the intuition that attribution of user activity, associated with client device 120, to particular user identifiers is not particularly reliable given the large number of users on the machine. As such, application of the device-specific confidence heuristic for client device 120 to a confidence metric for a given CI-I that is associated with an identifier of client device 120 leaves the confidence metric significantly diminished.

Link-Specific Confidence Heuristic

According to an embodiment, correlation service 154 applies a link-specific confidence heuristic to each CI-I record in data store 160, where the link-specific confidence heuristic is based on how well information from the CI-I record matches information from the user profile identified by the associated conclusive identifier. This confidence heuristic weakens the confidence metrics of CI-I records that do not match information from an associated user profile. According to an embodiment, application of the link-specific confidence heuristic to the confidence metric of the CI-I record leaves the confidence metric undiminished when all information in the record matches profile attribute values, and diminishes the confidence metric to a greater or lesser degree depending on how many attribute values of the profile do not match information in the record and, when applicable, how important the attributes are.

According to an embodiment, the amount of effect that the link-specific confidence heuristic has on the confidence metric of a given CI-I record depends on an importance level of the information from the user profile that contradicts the information in the CI-I record. For example, correlation service 154 maintains information indicating a weight for each of a set of user profile attributes in profiles of first service 152. The weights associated with the profile attributes may be represented in any way, such as a number between 1 and 10, a particular enumerated value from a set of values, e.g., [high, medium, low], a component heuristic for the attribute expressed as a percentage, etc. To illustrate using the component heuristic technique, correlation service 154 maintains information indicating the following weights for attributes in profiles for first service 152: first name (35%); last name (0%); middle name (80%); social security number (0%); phone number (80%); address (50%). These weights represent how likely it is that these values will change from one to another interaction of a given user with first service 152 and supporting systems.

The following is an example of applying the component link-specific confidence heuristics for one or more attributes of user profiles that have been contradicted by corresponding attribute values a CI-I record to weaken the confidence metric for the record accordingly. Specifically, for each attribute value in the CI-I record that contradicts a profile attribute value, the current confidence metric of the CI-I record is multiplied by the component heuristic of the profile attribute. For example, if the confidence metric of a given CI-I record is 75, and the first name of the record contridicts the first name of the profile associated with the record, then, after appliation of the link-specific confidence heuristic to the confidence metric, the confidence metric of the CI-I record becomes 75×35%=26.25. If both the address and the phone number of a given CI-I record having a confidence metric of 75 contradict corresponding attribute values in the associated profile, then application of the link-specific confidence heuristic to the confidence metric of the record causes the confidence metric to become 50%×80%×75=40%×75=30.

Using Machine Learning for Confidence Metrics

According to an embodiment, machine learning is used to determine confidence metrics for CI-I records. In order for a machine learning engine to determine confidence metrics for CI-I records, the machine learning engine is fed a training data set that includes histories of user interaction records, and also links resulting from the interaction records and corresponding confidence metrics that should be applied for the records (i.e., training outcomes for the data set). After training the machine learning engine, a resulting trained model can be applied to CI-I records to determine links that should be created based on the interaction records and also confidence metrics for the CI-I records that are not yet associated with confidence metrics. For example, after being trained, the trained model identifies that when a proxy exists, links between identifiers created based on a login event that involved the proxy use a different conclusive identifier instead of the one used during login (which could be a system account). As another example, the trained model learns that a particular IP address is associated with well-known fraud/phishing attempts, and automatically reduces confidence metrics down to zero for any event coming from the IP address.

Populating the Commit Logs for the Event Stream

As explained above, the commit logs associated with services that feed into event stream 417 are populated ("injected") with information indicating interactions between users and the services. During the processing of the commit logs, an event stream is generated. For each event represented in the event stream, there is information about the event that may be referred to as the "event payload". The event payload is controlled by the application itself, because the application of each service determines what information should be stored in the database of the service (and committed as part of the same database transaction that is making changes to the other tables used by the service). For example, the event payload for an event created by an update to a loan app table (in the creation of a new loan application) should have enough information for a correlation service 154 to determine what inconclusive identifiers, conclusive identifiers, and AOI identifiers were involved in the user interaction.

System Overview

According to one or more embodiments, example network arrangement 100 may include other devices, including client devices, server devices, and display devices. Each of client devices 110 and 120 may be implemented by any type of computing device that is communicatively connected to network 140. Example implementations of client devices 110 and 120 include, without limitation, workstations, personal computers, laptop computers, personal digital assistants (PDAs), tablet computers, cellular telephony devices such as smart phones, and any other type of computing device.

Each of server devices 130, 150, and 170 may be implemented by any type of computing device that is capable of communicating with over network 140. The devices of network arrangement 100 may be configured with other mechanisms, processes and functionalities, depending upon a particular implementation. Also, network 140 may be implemented with any type of medium and/or mechanism that facilitates the exchange of information between devices. Furthermore, network 140 may facilitate use of any type of communications protocol, and may be secured or unsecured, depending upon the requirements of a particular embodiment.

Also, data stores 160 and 180 may be implemented by any kind of data store mechanism, including any kind of database management system, and may be stored in any kind of storage that is internal or external to server device 150.

An application or service, such as first service 152, or correlation service 154, etc., runs on a computing device and comprises a combination of software and allocation of resources from the computing device. Specifically, an application or service is a combination of integrated software components and an allocation of computational resources, such as memory, and/or processes on the computing device for executing the integrated software components on a processor, the combination of the software and computational resources being dedicated to performing the stated functions of the application or service.

In an embodiment, each of the processes described herein as being performed by a service is performed automatically and may be implemented using one or more computer programs, other software elements, and/or digital logic in any of a general-purpose computer or a special-purpose computer, while performing data retrieval, transformation, and storage operations that involve interacting with and transforming the physical state of memory of the computer. Furthermore, any portion of the processes described in connection with a particular entity may be performed by another entity, according to one or more embodiments.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
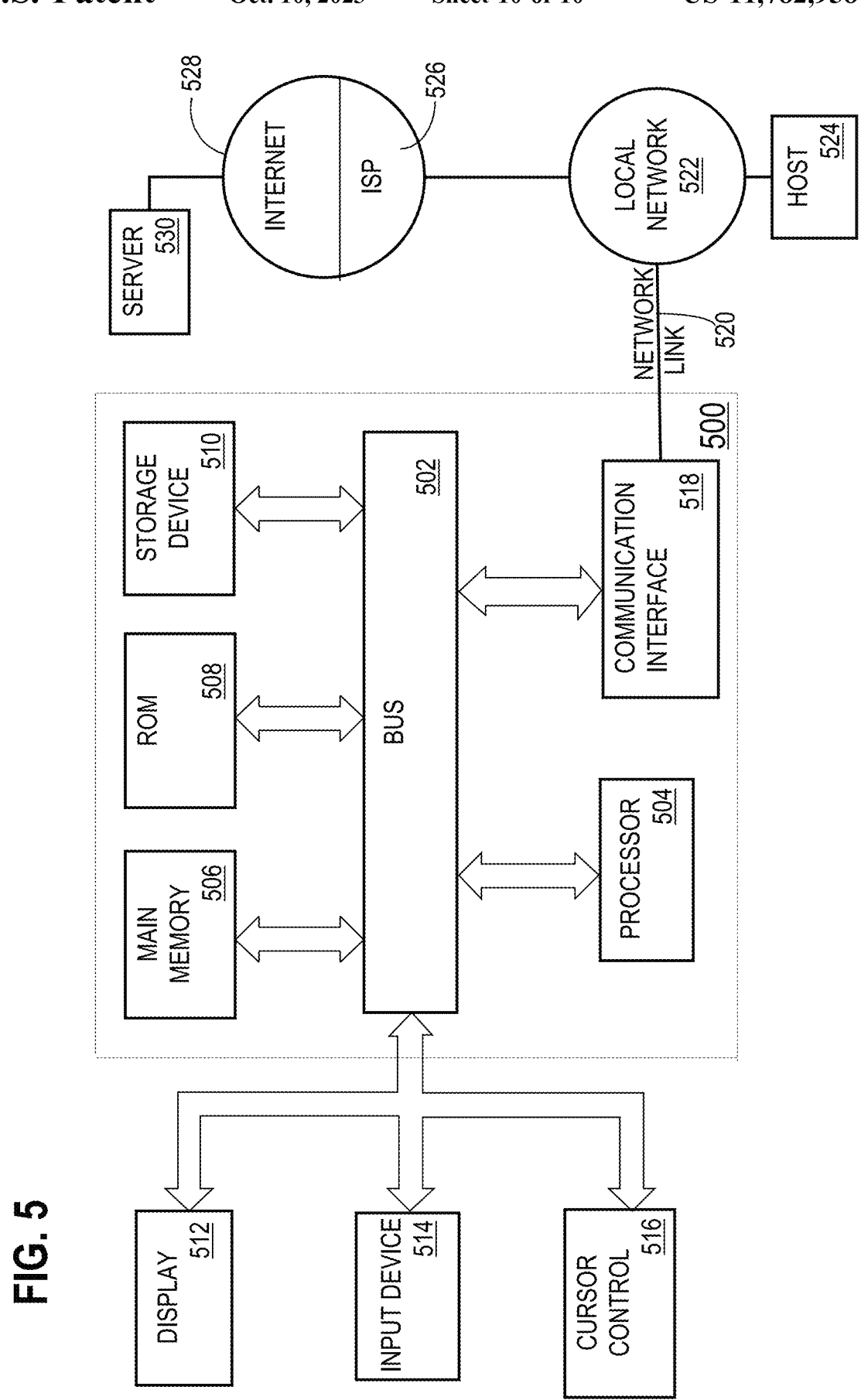
FIG. 5 is a block diagram of a computer system that may be used to implement the technique described herein.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk, optical disk, or solid-state drive is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 510. Volatile media includes dynamic memory, such as main memory 506. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid-state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprises two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure, applications, and servers, including one or more database servers.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-executed method comprising:
    determining that a particular information item, of a particular plurality of information items reflecting client-server interactions, is associated with (a) a particular inconclusive identifier, and (b) a conclusive identifier; and
    responsive to determining that the particular information item is associated with the conclusive identifier and the particular inconclusive identifier:
        identifying a particular set of information items, of the particular plurality of information items, that are associated with the particular inconclusive identifier, and
        storing, in a data store, attribution data that associates the particular set of information items with the conclusive identifier;
    wherein the method is performed by one or more computing devices.

2. The computer-executed method of claim 1, further comprising detecting the particular plurality of information items in an event stream populated from commit logs of one or more database management systems.

3. The computer-executed method of claim 1, wherein the particular plurality of information items includes both client-side-based information items and server-side-based information items.

4. The computer-executed method of claim 1, wherein:
    the particular plurality of information items reflects interactions between one or more client devices and a server device; and
    the method further comprises:
        determining that a second information item, of a second plurality of information items that reflect interactions between the one or more client devices and the server device, is associated with (a) a second inconclusive identifier, and (b) the conclusive identifier that identifies the particular person;
        wherein the second inconclusive identifier is different than the particular inconclusive identifier; and
        responsive to determining that the second information item is associated with the conclusive identifier and the second inconclusive identifier:
            identifying a second set of information items, of the second plurality of information items, that are associated with the second inconclusive identifier, and
            storing link data that associates the second set of information items with the conclusive identifier.

5. The computer-executed method of claim 4, wherein:
    each information item, of the particular set of information items, is associated with a respective timestamp;
    each information item, of the second set of information items, is associated with a respective timestamp;
    at least one information item, of the second set of information items, is associated with a timestamp that marks a time that occurred between times marked by timestamps associated with particular two information items of the particular set of information items;
    responsive to determining that the particular information item is associated with the conclusive identifier and the particular inconclusive identifier: storing, in the data store, the particular set of information items in temporal order based on the respective associated timestamps; and
    responsive to determining that the second information item is associated with the conclusive identifier and the second inconclusive identifier:
        storing, with the particular set of information items in the data store, the second set of information items in temporal order based on the respective associated timestamps,
        wherein the at least one information item, of the second set of information items, is ordered between the particular two information items, of the particular set of information items, in the data store.

6. The computer-executed method of claim 1, further comprising:
    determining that a second information item, of a second plurality of information items reflecting interaction between one or more client devices and a server device, is associated with (a) the particular inconclusive identifier, and (b) a second conclusive identifier that identifies a second person; and wherein the second plurality of information items is different than the particular plurality of information items;
responsive to determining that the second information item is associated with the second conclusive identifier and the particular inconclusive identifier:
identifying a second set of information items, of the second plurality of information items, that are associated with the particular inconclusive identifier, and
storing link data that associates the second set of information items with the second conclusive identifier.

7. The computer-executed method of claim 1, further comprising:
determining that at least one information item, of the particular set of information items, identifies a particular area of interest;
responsive to determining that the at least one information item identifies the particular area of interest, associating the particular area of interest with the particular inconclusive identifier; and
based, at least in part, on the association between the particular area of interest and the particular inconclusive identifier, associating each information item, of the particular set of information items, with the particular area of interest.

8. The computer-executed method of claim 1, further comprising:
responsive to determining that the particular information item is associated with the conclusive identifier and the particular inconclusive identifier, storing link data that identifies a link between the conclusive identifier and the particular inconclusive identifier;
based, at least in part, on the link data that identifies a link between the conclusive identifier and the particular inconclusive identifier, storing, in the data store, second attribution data that associates the conclusive identifier with a second information item reflecting interaction between one or more client devices and a server device item.

9. The computer-executed method of claim 8, further comprising, after storing the link data that identifies the link between the conclusive identifier and the particular inconclusive identifier:
breaking the link between the conclusive identifier and the particular inconclusive identifier based on the link satisfying one or more link removal criteria;
wherein each link removal criterion of the one or more link removal criteria is based, at least in part, on one or more of:
a timestamp of a most-recent linking record that associates the conclusive identifier and the particular inconclusive identifier,
whether any information in interaction records associated with the particular inconclusive identifier is inconsistent with information in a user profile associated with the conclusive identifier,
whether a more-recent non-compatible link has been established,
whether a new session identifier is found to be associated with a device identifier that was previously associated with a different session identifier, or
whether a dissociative interaction record has been detected for the link.

10. The computer-executed method of claim 1, further comprising, responsive to determining that the particular information item is associated with the conclusive identifier and the particular inconclusive identifier:
for each information item, of the particular set of one or more information items:
determining, based on one or more confidence heuristics, a confidence metric that indicates a confidence level of an association between the conclusive identifier and said each information item;
wherein the one or more confidence heuristics include one or more of:
a time-based confidence heuristic that is based, at least in part, on an amount of time between a timestamp of said each information item and a timestamp of an identifier link on which the association of said each information item with the conclusive identifier is based,
a device-specific confidence heuristic that is based, at least in part, on a number of users that have been detected using a device associated with said each information item, or
a link-specific confidence heuristic that is based, at least in part, on whether one or more attribute values of said each information item matches one or more attribute values in a user profile associated with the conclusive identifier; and
associating said each information item with the confidence metric.

11. One or more non-transitory computer-readable media storing one or more sequences of instructions that, when executed by one or more processors, cause:
determining that a particular information item, of a particular plurality of information items reflecting client-server interactions, is associated with (a) a particular inconclusive identifier, and (b) a conclusive identifier; and
responsive to determining that the particular information item is associated with the conclusive identifier and the particular inconclusive identifier:
identifying a particular set of information items, of the particular plurality of information items, that are associated with the particular inconclusive identifier, and
storing, in a data store, attribution data that associates the particular set of information items with the conclusive identifier.

12. The one or more non-transitory computer-readable media of claim 11, wherein the one or more sequences of instructions further comprise instructions that, when executed by one or more processors, cause detecting the particular plurality of information items in an event stream populated from commit logs of one or more database management systems.

13. The one or more non-transitory computer-readable media of claim 11, wherein the particular plurality of information items includes both client-side-based information items and server-side-based information items.

14. The one or more non-transitory computer-readable media of claim 11, wherein:
the particular plurality of information items reflects interactions between one or more client devices and a server device; and
the one or more sequences of instructions further comprise instructions that, when executed by one or more processors, cause:
determining that a second information item, of a second plurality of information items that reflect interactions between the one or more client devices and the server device, is associated with (a) a second inconclusive identifier, and (b) the conclusive identifier that identifies the particular person;
wherein the second inconclusive identifier is different than the particular inconclusive identifier; and
responsive to determining that the second information item is associated with the conclusive identifier and the second inconclusive identifier:
identifying a second set of information items, of the second plurality of information items, that are associated with the second inconclusive identifier, and
storing link data that associates the second set of information items with the conclusive identifier.

15. The one or more non-transitory computer-readable media of claim 14, wherein:
each information item, of the particular set of information items, is associated with a respective timestamp;
each information item, of the second set of information items, is associated with a respective timestamp;
at least one information item, of the second set of information items, is associated with a timestamp that marks a time that occurred between times marked by timestamps associated with particular two information items of the particular set of information items;
responsive to determining that the particular information item is associated with the conclusive identifier and the particular inconclusive identifier: storing, in the data store, the particular set of information items in temporal order based on the respective associated timestamps; and
responsive to determining that the second information item is associated with the conclusive identifier and the second inconclusive identifier:
storing, with the particular set of information items in the data store, the second set of information items in temporal order based on the respective associated timestamps,
wherein the at least one information item, of the second set of information items, is ordered between the particular two information items, of the particular set of information items, in the data store.

16. The one or more non-transitory computer-readable media of claim 11, wherein the one or more sequences of instructions further comprise instructions that, when executed by one or more processors, cause:
determining that a second information item, of a second plurality of information items reflecting interaction between one or more client devices and a server device, is associated with (a) the particular inconclusive identifier, and (b) a second conclusive identifier that identifies a second person; and
wherein the second plurality of information items is different than the particular plurality of information items;
responsive to determining that the second information item is associated with the second conclusive identifier and the particular inconclusive identifier:
identifying a second set of information items, of the second plurality of information items, that are associated with the particular inconclusive identifier, and
storing link data that associates the second set of information items with the second conclusive identifier.

17. The one or more non-transitory computer-readable media of claim 11, wherein the one or more sequences of instructions further comprise instructions that, when executed by one or more processors, cause:
determining that at least one information item, of the particular set of information items, identifies a particular area of interest;
responsive to determining that the at least one information item identifies the particular area of interest, associating the particular area of interest with the particular inconclusive identifier; and
based, at least in part, on the association between the particular area of interest and the particular inconclusive identifier, associating each information item, of the particular set of information items, with the particular area of interest.

18. The one or more non-transitory computer-readable media of claim 11, wherein the one or more sequences of instructions further comprise instructions that, when executed by one or more processors, cause:
responsive to determining that the particular information item is associated with the conclusive identifier and the particular inconclusive identifier, storing link data that identifies a link between the conclusive identifier and the particular inconclusive identifier;
based, at least in part, on the link data that identifies a link between the conclusive identifier and the particular inconclusive identifier, storing, in the data store, second attribution data that associates the conclusive identifier with a second information item reflecting interaction between one or more client devices and a server device item.

19. The one or more non-transitory computer-readable media of claim 18, wherein the one or more sequences of instructions further comprise instructions that, when executed by one or more processors, cause, after storing the link data that identifies the link between the conclusive identifier and the particular inconclusive identifier:
breaking the link between the conclusive identifier and the particular inconclusive identifier based on the link satisfying one or more link removal criteria;
wherein each link removal criterion of the one or more link removal criteria is based, at least in part, on one or more of:
a timestamp of a most-recent linking record that associates the conclusive identifier and the particular inconclusive identifier,
whether any information in interaction records associated with the particular inconclusive identifier is inconsistent with information in a user profile associated with the conclusive identifier,
whether a more-recent non-compatible link has been established,
whether a new session identifier is found to be associated with a device identifier that was previously associated with a different session identifier, or
whether a dissociative interaction record has been detected for the link.

20. The one or more non-transitory computer-readable media of claim 11, wherein the one or more sequences of instructions further comprise instructions that, when executed by one or more processors, cause, responsive to determining that the particular information item is associated with the conclusive identifier and the particular inconclusive identifier:
for each information item, of the particular set of one or more information items:
determining, based on one or more confidence heuristics, a confidence metric that indicates a confidence level of an association between the conclusive identifier and said each information item;

wherein the one or more confidence heuristics include one or more of:

a time-based confidence heuristic that is based, at least in part, on an amount of time between a timestamp of said each information item and a timestamp of an identifier link on which the association of said each information item with the conclusive identifier is based, a device-specific confidence heuristic that is based, at least in part, on a number of users that have been detected using a device associated with said each information item, or a link-specific confidence heuristic that is based, at least in part, on whether one or more attribute values of said each information item matches one or more attribute values in a user profile associated with the conclusive identifier; and associating said each information item with the confidence metric.

\* \* \* \* \*